(12) United States Patent
Hyoudou

(10) Patent No.: US 8,687,637 B2
(45) Date of Patent: Apr. 1, 2014

(54) COMMUNICATION CONTROL METHOD AND RELAY DEVICE

(75) Inventor: Kazuki Hyoudou, Chofu (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 13/424,915

(22) Filed: Mar. 20, 2012

(65) Prior Publication Data

US 2012/0307829 A1 Dec. 6, 2012

(30) Foreign Application Priority Data

May 31, 2011 (JP) .................... 2011-122483

(51) Int. Cl.
*H04L 12/28* (2006.01)

(52) U.S. Cl.
USPC ..................... 370/392; 370/389; 370/401

(58) Field of Classification Search
None
See application file for complete search history.

(56) References Cited

U.S. PATENT DOCUMENTS

| | | | |
|---|---|---|---|
| 2003/0147347 A1* | 8/2003 | Chen et al. | 370/229 |
| 2003/0219014 A1 | 11/2003 | Kotabe et al. | |
| 2004/0120334 A1* | 6/2004 | Nation | 370/412 |
| 2007/0002848 A1* | 1/2007 | Kudou et al. | 370/378 |
| 2007/0058544 A1 | 3/2007 | Kim et al. | |

FOREIGN PATENT DOCUMENTS

| | | |
|---|---|---|
| JP | 2002-33766 | 1/2002 |
| JP | 2003-338837 | 11/2003 |
| JP | 2004-208124 | 7/2004 |
| JP | 2007-28638 | 2/2007 |

* cited by examiner

*Primary Examiner* — David Oveissi

(74) *Attorney, Agent, or Firm* — Staas & Halsey LLP

(57) ABSTRACT

A communication control method for controlling communication between a first node and a second node via a relay device, the method includes transmitting a control packet from the first node to the second node before transmitting a first packet which is a higher priority than another packet to be relayed, stopping a packet from being output from a packet storage device for the another packet by the relay device, for a period indicated by the control packet, the packet storage device being included in one of a plurality of output ports of the relay device from which the first packet is to be output, and transmitting the first packet from the first node to the second node or from the second node to the first node during the period.

12 Claims, 46 Drawing Sheets

FIG. 5

| OUTPUT PORT NUMBER | LINK SPEED | MTU | PREDICTED DELAY TIME |
|---|---|---|---|
| 1 | 1000 | 9000 | 72 |
| 2 | 100 | 1500 | 120 |
| ⋮ | ⋮ | ⋮ | ⋮ |
| N | 1000 | 1500 | 12 |

FIG. 6

| SOURCE NORD | DESTINATION NODE | TRANSMISSION DELAY TIME |
|---|---|---|
| N2 | N6 | $\alpha_1$ |
| N6 | N2 | $\alpha_2$ |
| ⋮ | ⋮ | ⋮ |

FIG. 9

| DEST | SRC | TYPE | RML1 | RML2 | ... |
|------|-----|---------|------|------|-----|
| N6 | N2 | INQUIRE | 0 | 0 | ... |

FIG. 11

| DEST | SRC | TYPE | RML1 | RML2 | ... |
|------|-----|---------|------|------|-----|
| N6   | N2  | INQUIRE | 120  | 0    | ... |

FIG. 13

| NODE | DIRECTION | PREDICTED DELAY TIME |
|---|---|---|
| N2 | B | 264 |
| N2 | F | 312 |

FIG. 16

| DEST | SRC | TYPE | RML1 | RML2 | ... |
|------|-----|------|------|------|-----|
| N2 | N6 | RESPONSE | 264 | 0 | ... |

FIG. 18

| DEST | SRC | TYPE | RML1 | RML2 | ... |
|------|-----|----------|------|------|-----|
| N2 | N6 | RESPONSE | 264 | 72 | ... |

FIG. 20

| NODE | DIRECTION | PREDICTED DELAY TIME |
|------|-----------|---------------------|
| N6 | F | 264 |
| N6 | B | 312 |

FIG. 22

| DEST | SRC | TYPE | RML1 | RML2 | ... |
|------|-----|------|------|------|-----|
| N6 | N2 | ACK | 264 | 312 | ... |

FIG. 25

| DEST | SRC | TYPE | FDIR | PAUSE | ... |
|------|-----|------|------|-------|-----|
| N6 | N2 | FORWARD | 0 | 264 | ... |

FIG. 31

| DEST | SRC | TYPE | FDIR | PAUSE | ... |
|------|-----|---------|------|-------|-----|
| N6 | N2 | FORWARD | 1 | 312 | ... |

FIG. 42

| DEST | SRC | TYPE | RML1 | ... |
|------|-----|------|------|-----|
| N2   | N6  | ACK  | 264  | ... |

COMMUNICATION CONTROL METHOD AND RELAY DEVICE

CROSS-REFERENCE TO RELATED APPLICATION

This application is based upon and claims the benefit of priority of the prior Japanese Patent Application No. 2011-122483, filed on May 31, 2011, the entire contents of which are incorporated herein by reference.

FIELD

The embodiments discussed herein are related to a communication control technique.

BACKGROUND

Various techniques for transmitting real-time data to be transmitted in real time and non-real-time data not to be transmitted in real time via the same network are available. For example, a bandwidth control device disposed between a local area network (LAN) and a wireless network detects a bias toward non-real-time communication and performs control to suppress non-real-time communication, thereby reserving fixed bandwidth for real-time communication to reduce overflow in the real-time communication. This technique can ensure the quality of real-time communication that uses fixed bandwidth, such as audio communication. Although this technique may on average ensure the quality of real-time communication such as audio communication, a large delay may sometimes occur.

In another technique, when receiving non-real-time communication data having a preset frame length or longer, a relay device or any other suitable device divides the non-real-time communication data into frames of a length less than or equal to the preset frame length, thereby reducing the occurrence of collisions between real-time communication and non-real-time communication. In this case, collisions may not be completely avoided, and an increase in the number of relay devices along a path would increase the delay. In addition, the quality of real-time communication can be adjusted with the division size of non-real-time communication data; however, the following problems occur. If the division size is too large, the number of collisions increases. If the division size is reduced, the actual bandwidth in a network is reduced because of an increase in header length, and the processing load on a receiving node is increased.

For example, if an output port of a relay device such as a switch from which real-time data is to be output is already being used to output non-real-time data, even though it is possible to preferentially process real-time data, transmission of real-time data may be disturbed by a frame of non-real-time data currently being transmitted at a time when the relay device is receiving the real-time data, and the transmission of the real-time data may be delayed by an amount corresponding to the size of the frame. For example, a 1 Gbps (=125 M Bytes/sec) switch with a maximum transmission unit (MTU) of 9000 bytes has a maximum delay of approximately 72 (=9000/125 M) μs. Since each relay device has a maximum delay as given above, the larger the number of relay devices before a destination node, the larger the delay caused by such frame collision.

Examples of the related art are disclosed in Japanese Laid-open Patent Publication No. 2004-208124, Japanese Laid-open Patent Publication No. 2002-33766, Japanese Laid-open Patent Publication No. 2003-338837, and Japanese Laid-open Patent Publication No. 2007-28638.

SUMMARY

According to an aspect of the invention, a communication control method for controlling communication between a first node and a second node via a relay device, the method includes transmitting a control packet from the first node to the second node before transmitting a first packet which is a higher priority than another packet to be relayed, stopping a packet from being output from a packet storage device for the another packet by the relay device, for a period indicated by the control packet, the packet storage device being included in one of a plurality of output ports of the relay device from which the first packet is to be output, and transmitting the first packet from the first node to the second node or from the second node to the first node during the period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of data to be stored in a delay database (DB);

FIG. 6 is a diagram illustrating an example of data stored in a delay DB;

FIG. 9 is a diagram illustrating a packet format of a request packet;

FIG. 11 is a diagram illustrating an example of a processed request packet;

FIG. 13 is a diagram illustrating an example of data to be stored in a first data storage unit of the node N6;

FIG. 16 is a diagram illustrating a packet format of a response packet;

FIG. 18 is a diagram illustrating an example of a processed response packet;

FIG. 20 is a diagram illustrating an example of data to be stored in a first data storage unit of the node N2;

FIG. 22 is a diagram illustrating a packet format of a response acknowledgment packet;

FIG. 25 is a diagram illustrating a packet format of a preliminary indication packet;

FIG. 31 is a diagram illustrating a packet format of a preliminary indication packet in case of backward transmission;

FIG. 42 is a diagram illustrating a packet format of the response acknowledgment packet in a case where only forward transmission is performed;

DESCRIPTION OF EMBODIMENTS

Figure 1:
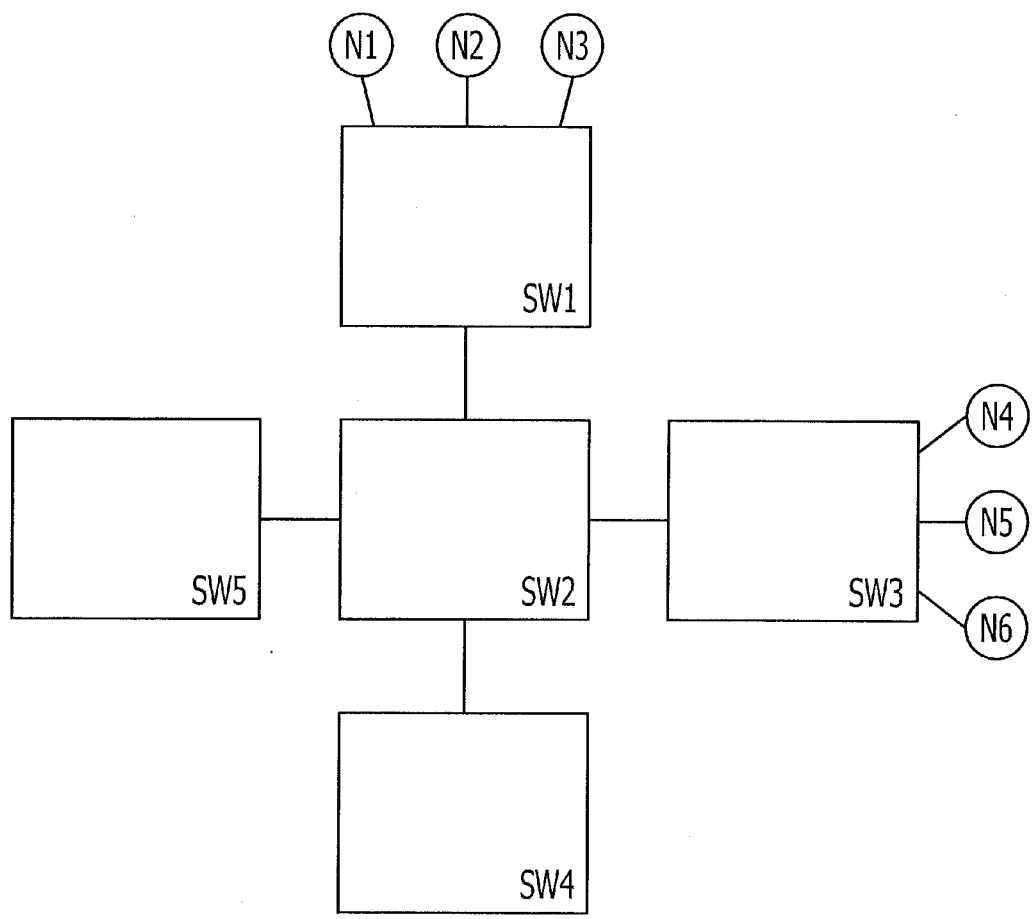
FIG. 1 is a diagram illustrating an example of a network according to an embodiment.

In an embodiment, a network illustrated in FIG. 1 is used. In this embodiment, relay devices are implemented as switches. A switch SW1 is coupled to nodes N1, N2, and N3, and is also coupled to a switch SW2. The switch SW2 is further coupled to switches SW5, SW4, and SW3. The switch SW3 is coupled to nodes N4, N5, and N6. Each of the switches SW2, SW4, and SW5 is also coupled to a node or nodes, which are not illustrated or described herein. In this embodiment, furthermore, the node N6 functions as a sensor and an actuator, and is configured to, for example, output a measured value or the like periodically or in accordance with a request. The node N2 functions as a controller, and is configured to obtain a measured value from the node N6 functioning as a sensor, generate a control value in accordance with the measured value, and transmit the control value to the node N6 functioning as an actuator.

Figure 2:
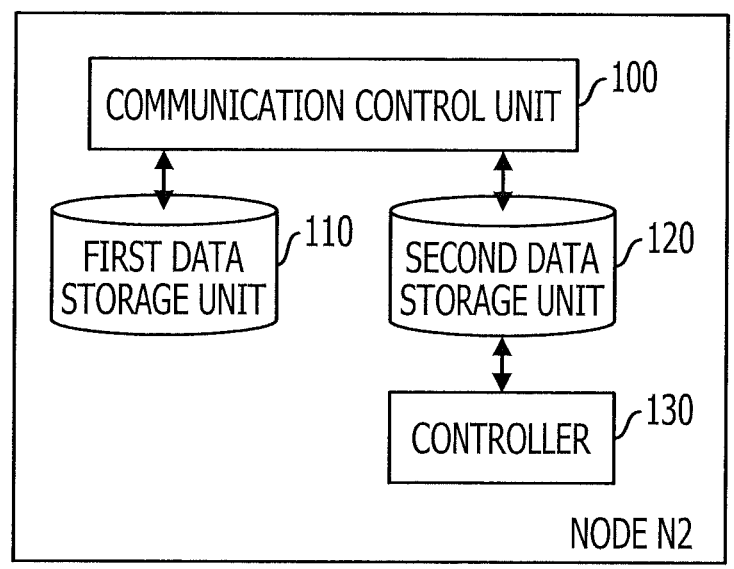
FIG. 2 is a functional block diagram of a node N2.

The node N2 has a configuration illustrated in, for example, FIG. 2. The node N2 includes a communication control unit 100, a first data storage unit 110 that stores data to be used when, for example, the communication control unit 100 transmits a control packet, a controller 130 that performs a given control process, and a second data storage unit 120 that stores data output from the controller 130 and data received from another node.

Figure 3:
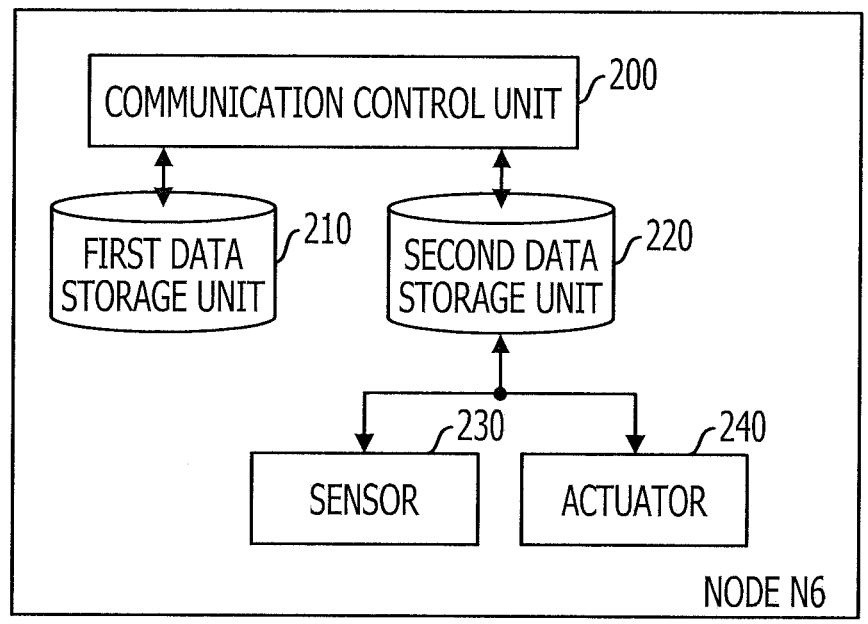
FIG. 3 is a functional block diagram of a node N6.

The node N6 has a configuration illustrated in, for example, FIG. 3. The node N6 includes a communication control unit 200, a first data storage unit 210 that stores data to be used when, for example, the communication control unit 200 transmits a control packet, a sensor 230 that measures a given physical quantity etc., an actuator 240 that performs a given operation in accordance with an instruction from the controller 130, and a second data storage unit 220 that stores data output from the sensor 230 and data received from another node.

Figure 4:
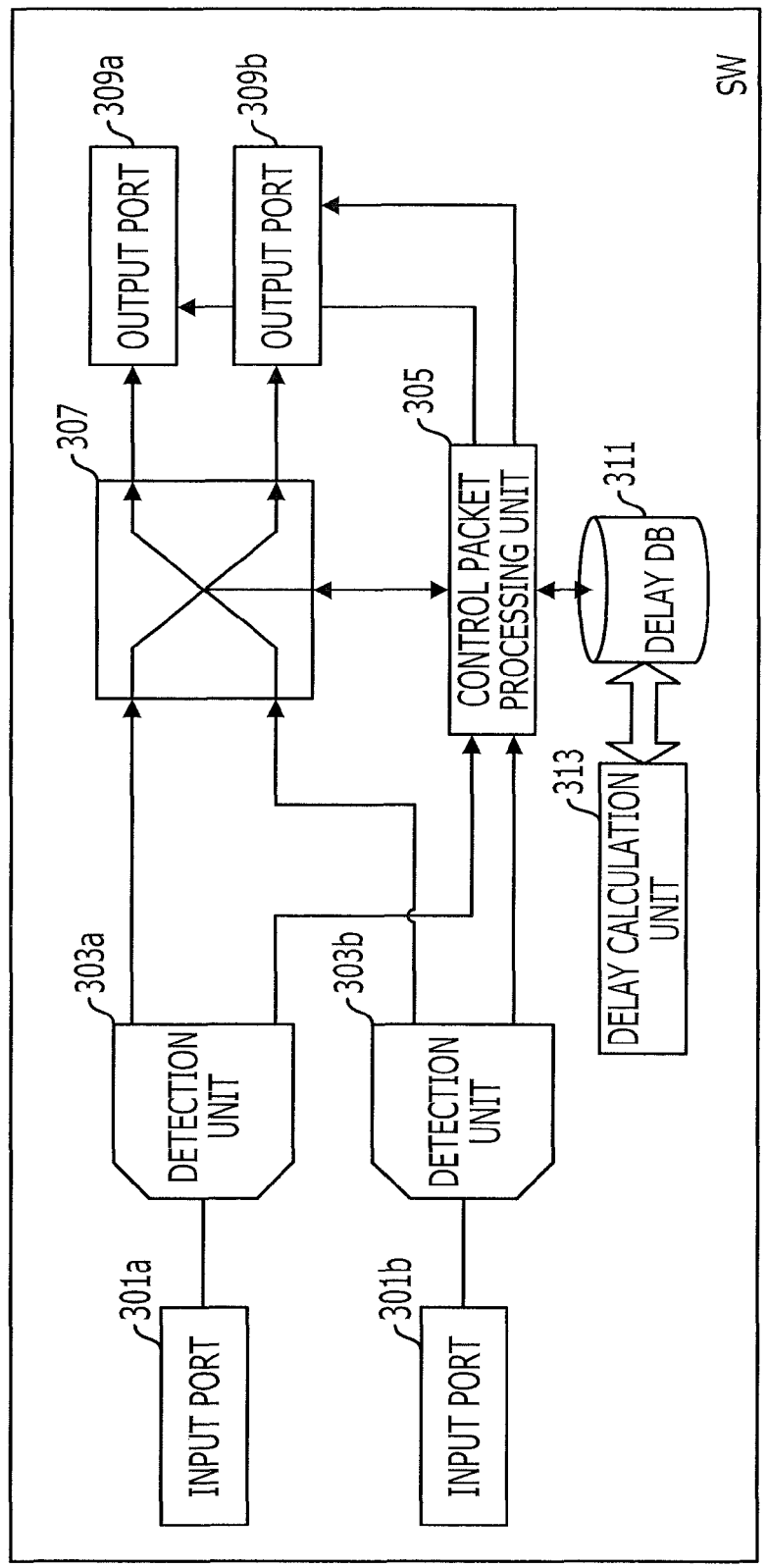
FIG. 4 is a functional block diagram of a switch.

FIG. 4 illustrates a functional block diagram of each of the switches SW1 to SW5 (referred to as the "switch SW"). The switch SW includes a plurality of input ports 301 (in FIG. 4, 301a and 301b), a plurality of detection units 303 (in FIG. 4, 303a and 303b), a switching unit 307, a plurality of output ports 309 (in FIG. 4, 309a and 309b), a control packet processing unit 305, a delay database (DB) 311, and a delay calculation unit 313.

Each of the detection units 303 is associated with one of the input ports 301. When one of the detection units 303 detects a control packet described below among packets received by the associated input port 301, the detection unit 303 outputs the data of the control packet to the control packet processing unit 305. The detection unit 303 further outputs any other received packet to the switching unit 307. The switching unit 307 specifies one of the output ports 309 from which the received packet is to be output, from the destination address of the packet, and outputs the packet to the specified output port 309. Upon receiving the packet from the switching unit 307, the output port 309 stores the packet in a queue (a storage device such as a buffer), and thereafter reads and outputs the packet from the queue at a given timing.

Upon receiving the control packet from the detection unit 303, the control packet processing unit 305 performs a process described below, and outputs the control packet to the switching unit 307. The control packet processing unit 305 is configured to specify an identifier (for example, a number) of a corresponding one of the output ports 309 from the destination address or the like. The control packet processing unit 305 also controls the output port 309.

The control packet processing unit 305 may perform a process using data stored in the delay DB 311. The delay calculation unit 313 generates data to be stored in the delay DB 311.

FIG. 5 illustrates an example of data to be stored in the delay DB 311. In the example illustrated in FIG. 5, for each output port, a link speed (for example, in Mbps), an MTU (in byte), and a predicted delay time that will be incurred when a packet is output from the output port are registered. For example, the data other than the predicted delay time is stored in advance, and the delay calculation unit 313 calculates a predicted delay time given by MTU/link speed/8, and registers the calculated predicted delay time in the delay DB 311. The delay calculation unit 313 may collect the link speed and the MTU for each output port, and register the link speeds and the MTUs in the delay DB 311, or an administrator may set the link speed and the MTU for each output port.

The delay DB 311 also stores data illustrated in FIG. 6. In the example illustrated in FIG. 6, a transmission delay time is registered for each combination of source and destination nodes. The transmission delay time is a time taken to transmit a packet from a source node to a destination node if no collision or other errors occur in a switch located along a path between the source node and the destination node. The transmission delay time is the sum of the transmission delay in a cable and the minimum transfer delay of the switch. For example, as illustrated in FIG. 6, a transmission delay time may be measured and set for each combination of source and destination nodes, or, in some cases, one value, e.g., the maximum value of the measurement results determined for the respective combinations, may be set.

Figure 7:
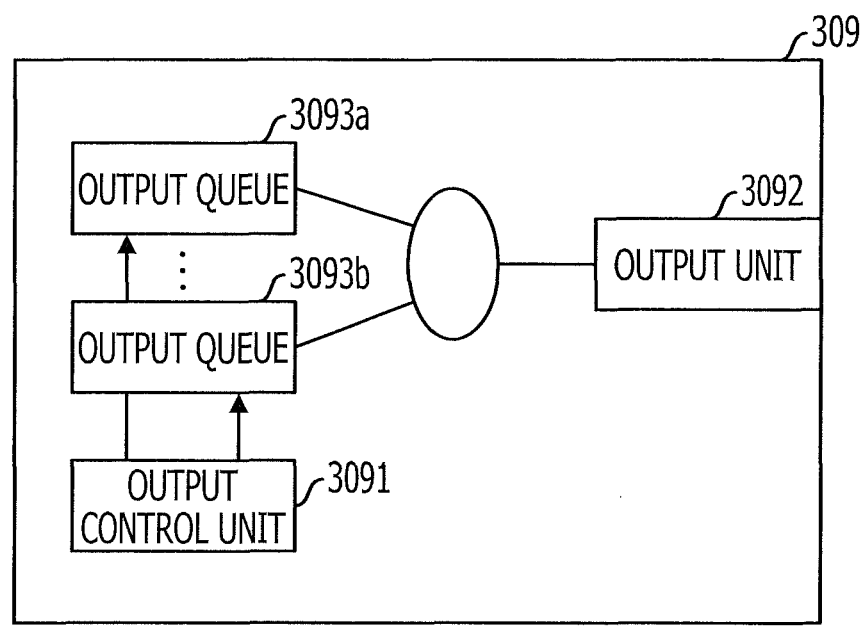
FIG. 7 is a functional block diagram of an output port.

Each of the output ports 309 of the switch SW has a configuration illustrated in FIG. 7. The output port 309 includes output queues 3093 (in FIG. 7, 3093a and 3093b) provided for, for example, individual priorities, an output control unit 3091 that controls the output port 309, and an output unit 3092 that is coupled to the output queues 3093 and that outputs data output from the output queues 3093. In this embodiment, for example, the output queue 3093a is configured to store a packet having a high priority to be transmitted in real time, and the output queue 3093b is configured to store a packet having a low priority. A larger number of output queues may be provided to support more priorities.

The output control unit 3091 controls the output of packets from the output queues 3093, and also performs control to, as described below, stop the output of packets from the output queue 3093b that stores a packet having a low priority. For example, when a control packet is to be sent, as described below, the output control unit 3091 may perform a process for performing an arithmetic operation of subtracting a given time from a control time included in the control packet (forward predicted delay time or backward predicted delay time described below) and then updating the value (control time) in the control packet.

Figure 8:
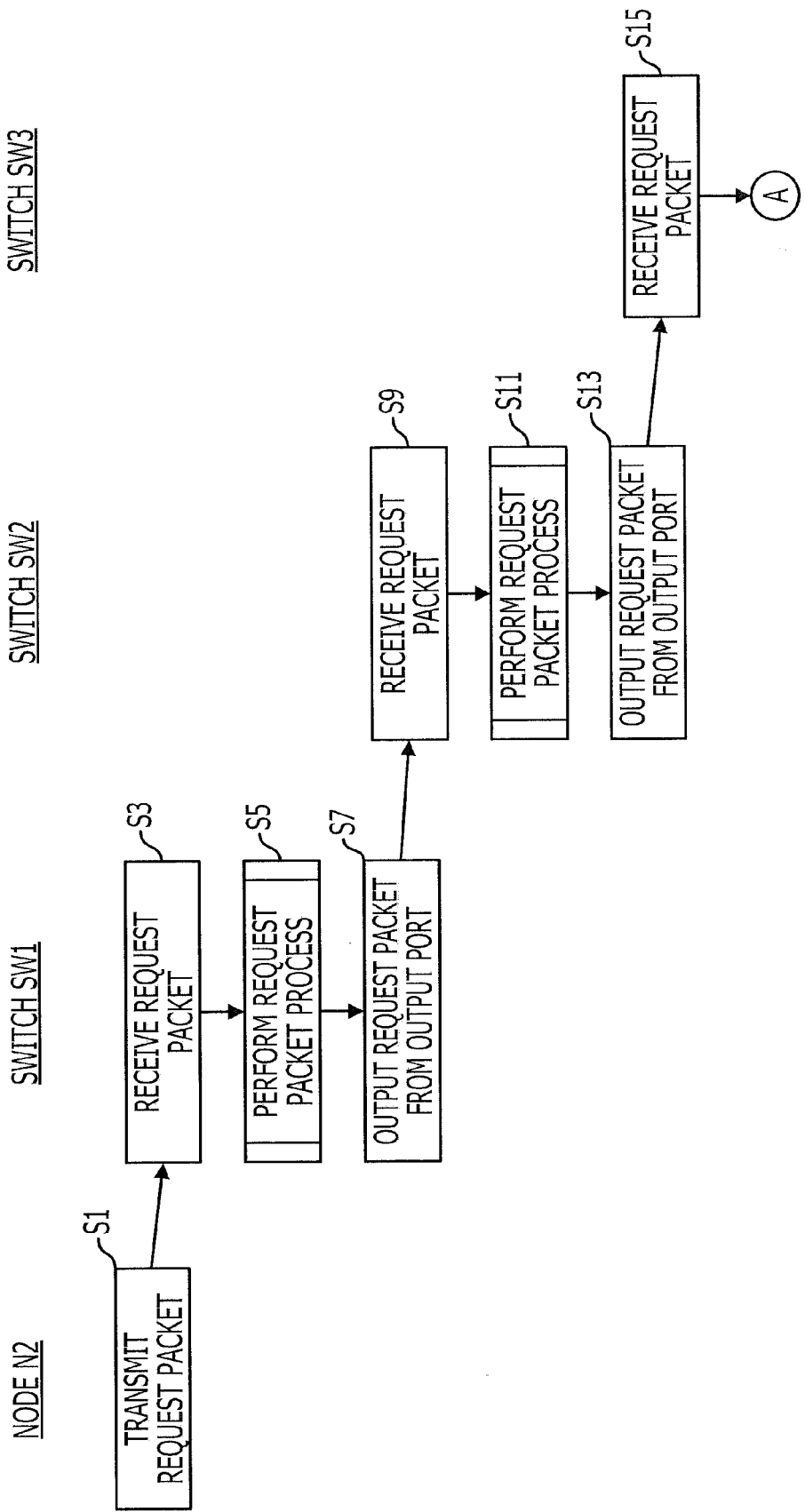
FIG. 8 is a diagram illustrating a process flow according to an embodiment.

The operation of the network illustrated in FIG. 1 will be described with reference to FIGS. 8 to 44. First, a description will be given of a process for transmitting a request packet, which is a control packet, from the node N2 to the node N6. The communication control unit 100 of the node N2 generates a request packet addressed to the node N6, and transmits the request packet to the switch SW1 (FIG. 8: step S1). The request packet is a packet having a format illustrated in, for example, FIG. 9. In the example illustrated in FIG. 9, the request packet contains the destination node ("Dest") N6, the source node ("Src") N2, the type of control packet ("Type"), which is set to "Inquire" representing a request packet, a forward predicted delay time Rml1 from the source node N2 to the destination node N6, and a backward predicted delay time Rml2 from the destination node N6 to the source node N2. Both the forward predicted delay time Rml1 and the backward predicted delay time Rml2 are set to 0 at the time when the request packet is sent from the node N2.

When one of the input ports 301 of the switch SW1 receives the request packet from the node N2, the input port 301 outputs the request packet to the associated detection unit 303 (step S3). Upon detecting the receipt of the request packet, the detection unit 303 outputs the request packet to the control packet processing unit 305. Upon receiving the request packet from the detection unit 303, the control packet processing unit 305 performs a request packet process (step S5). The request packet process will be described with reference to FIGS. 10 and 11.

Figure 9:
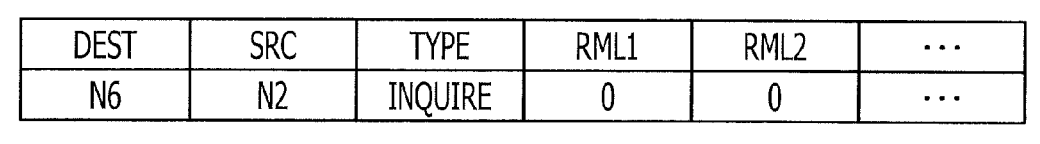
Figure 10:
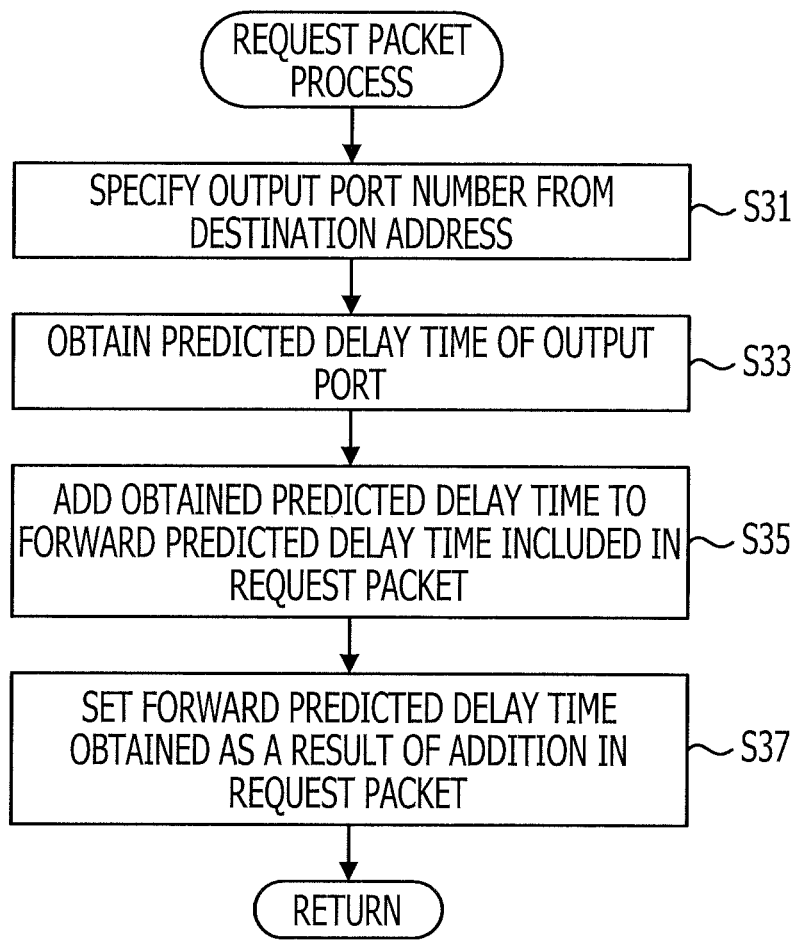
FIG. 10 is a diagram illustrating a process flow of a request packet process.

First, the control packet processing unit 305 specifies the output port number of one of the output ports 309 from which the request packet is to be output, from the destination address of the request packet (FIG. 10: step S31). For example, the number of one of the output ports 309 corresponding to the destination address may be obtained from the switching unit 307. Then, the control packet processing unit 305 reads the predicted delay time of the specified output port 309 from the delay DB 311 (step S33). After that, the control packet processing unit 305 adds the obtained predicted delay time to the forward predicted delay time Rml1 included in the request packet (step S35). For example, if, as illustrated in FIG. 9, the forward predicted delay time Rml1 is 0 and if, as illustrated in FIG. 5, the port number of the specified output port 309 is "2" and the predicted delay time is "120", the result of addition is "120".

Figure 11:
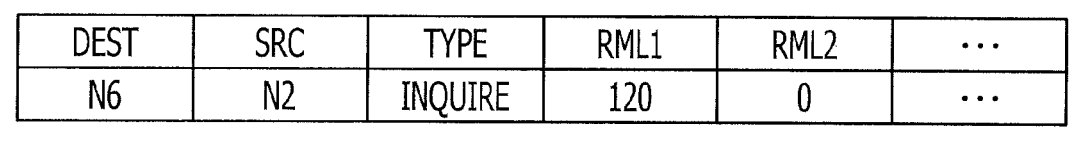

Then, the control packet processing unit 305 sets the forward predicted delay time obtained as a result of addition in the request packet (step S37). In this example, as illustrated in FIG. 11, the forward predicted delay time Rml1 is set to 120. Then, the process returns to the process illustrated in FIG. 8.

Referring back to the process illustrated in FIG. 8, the control packet processing unit 305 outputs the processed request packet to the switching unit 307, and the switching unit 307 outputs the processed request packet to a corresponding one of the output ports 309. The output port 309 stores the request packet in a desired one of the output queues 3093 as a packet having a normal priority. After that, the output control unit 3091 outputs an instruction to the output queue 3093 in a normal manner to output the request packet (step S7). Here, the switch SW2 is a switch to which the request packet is to be output.

The switch SW2 receives the request packet from the switch SW1 (step S9), performs a request packet process on the request packet (step S11), and outputs a processed request packet from a corresponding one of the output ports 309 (step S13). Steps S9, S11, and S13 are similar to steps S3, S5, and S7 performed by the switch SW1, respectively, and a detailed description thereof is thus omitted. The switch SW2 outputs the request packet to the switch SW3.

The switch SW3 receives the request packet from the switch SW2 (step S15). The process proceeds to a process illustrated in FIG. 12 via connector A.

Figure 12:
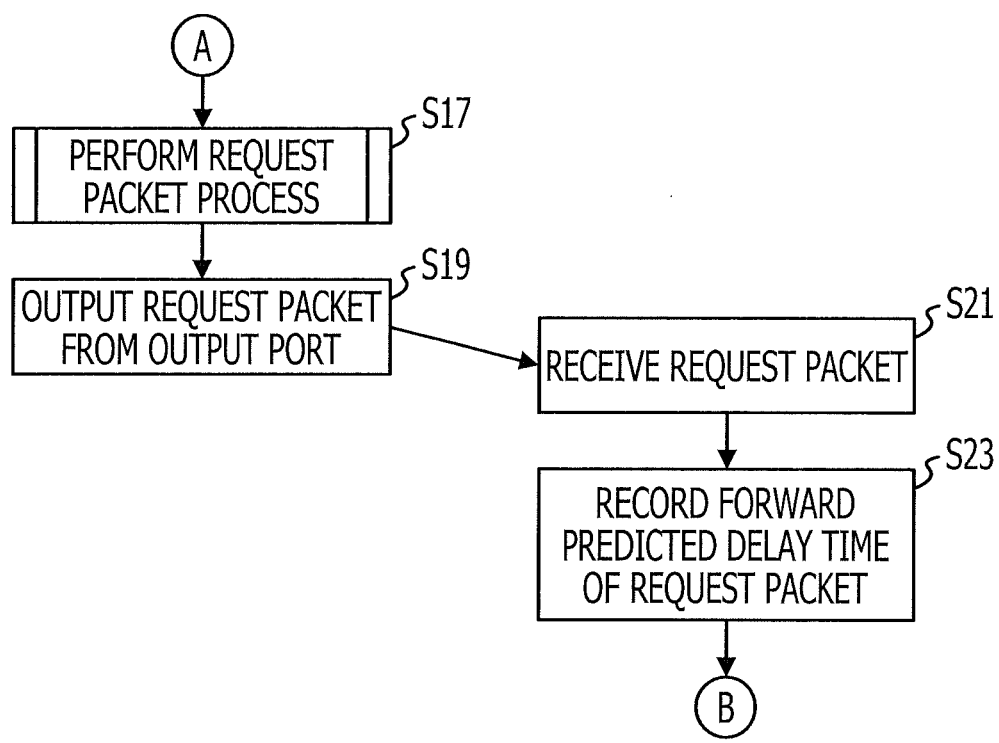
FIG. 12 is a diagram illustrating a process flow according to an embodiment.
Figure 14:
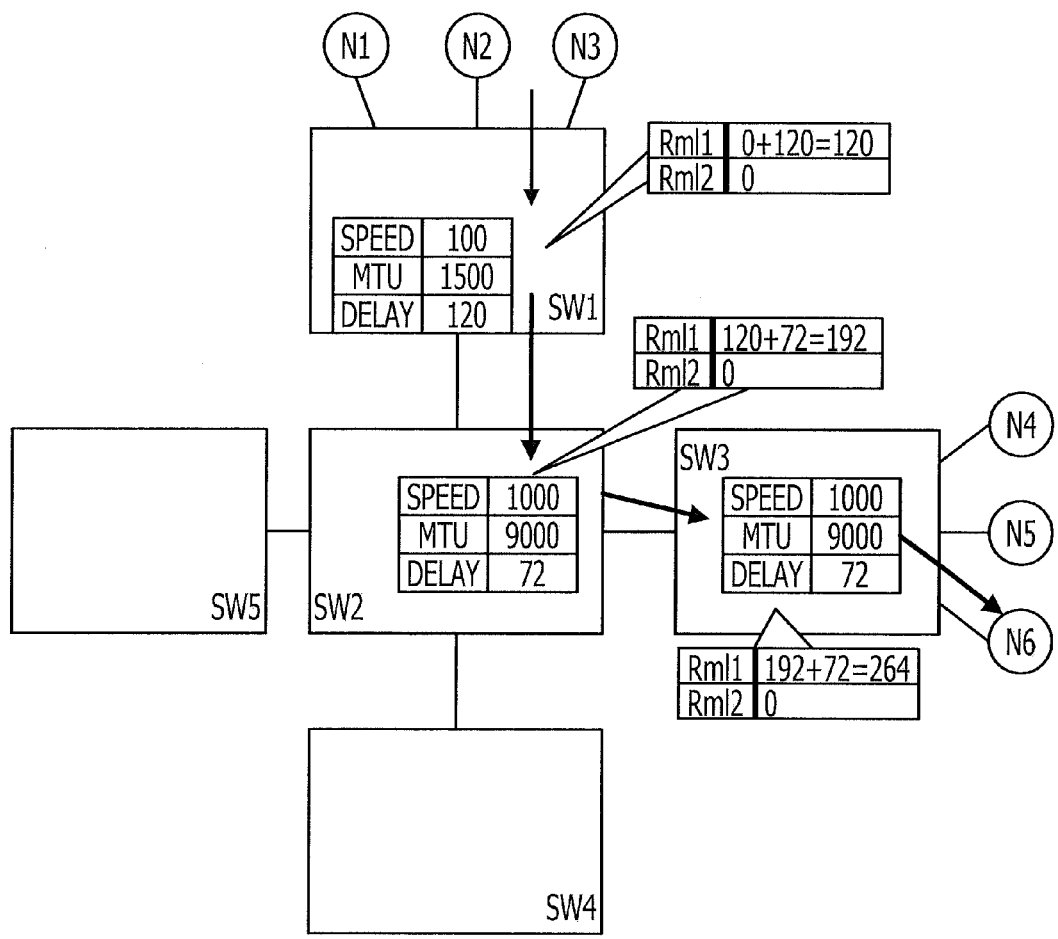
FIG. 14 is a diagram illustrating an overview of a process for a request packet.

Referring to FIG. 12, the switch SW3 performs a request packet process on the received request packet (step S17), and outputs a processed request packet from a corresponding one of the output ports 309 (step S19). Steps S15, S17, and S19 are also similar to steps S3, S5, and S7 performed by the switch SW1, respectively, and a detailed description thereof is thus omitted. The switch SW3 outputs the request packet to the node N6.

When the node N6 receives the request packet (step S21), the communication control unit 200 of the node N6 stores the value of the forward predicted delay time Rml1 included in the received request packet in the first data storage unit 210 as a backward predicted delay time in association with the identifier of the destination node (step S23). The process proceeds to a process illustrated in FIG. 15 through connector B.

For example, as illustrated in FIG. 13, the communication partner node, the direction, and the predicted delay time (also called a maximum predicted delay time) are stored in the first data storage unit 210. Since the node that has received the request packet has obtained a predicted delay time which will be incurred when the node receives a real-time packet from the source node of the request packet, "B", which represents the "backward" direction, is set in the "direction" column to represent a backward prediction of delay time. The record in the second row in FIG. 13 has not been registered in this stage. For data in the reverse direction, "F", which represents the "forward" direction, is set in the "direction" column to represent a forward prediction of delay time.

An overview of the above process will be described again with reference to FIG. 14. A request packet output from the node N2 contains the forward predicted delay time Rml1, which is 0, and the backward predicted delay time Rml2, which is 0. When the request packet reaches the switch SW1, the predicted delay time Delay, which is 120, is added to the forward predicted delay time Rml1, and the request packet containing the forward predicted delay time Rml1 obtained as a result of addition is output, which is 120. When the request packet reaches the switch SW2, the predicted delay time Delay, which is 72, is added to the forward predicted delay time Rml1, which is 120, and the request packet containing the forward predicted delay time Rml1 obtained as a result of addition, which is 192, is output. Further, when the request packet reaches the switch SW3, the predicted delay time Delay, which is 72, is added to the forward predicted delay time Rml1, which is 192, and the request packet containing the forward predicted delay time Rml1 obtained as a result of addition, which is 264, is output. In this manner, the node N6 is notified of the forward predicted delay time Rml1, which is 264. As described above, the communication control unit 200 of the node N6 stores the forward predicted delay time Rml1 in the first data storage unit 210 as the backward predicted delay time for transmission to the node N2.

Figure 15:
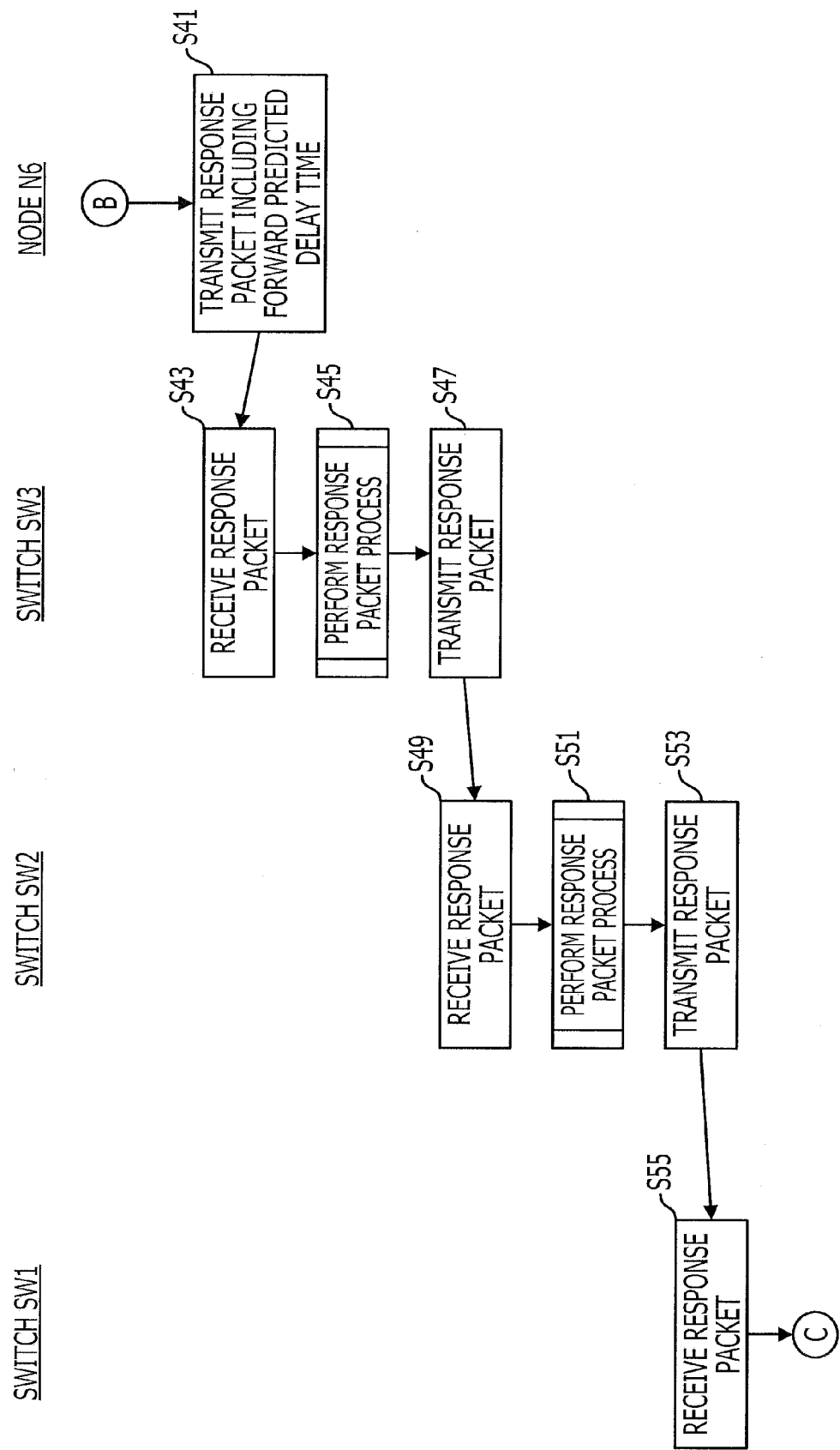
FIG. 15 is a diagram illustrating a process flow according to an embodiment.

Referring to FIG. 15, the communication control unit 200 of the node N6 transmits a response packet that is a control packet containing the forward predicted delay time Rml1 included in the received request packet to the node N2 that is the source node of the request packet (step S41). Specifically, the response packet is transmitted to the switch SW3. FIG. 16 illustrates, for example, an example of the header format of the response packet. In the example illustrated in FIG. 16, the response packet contains the destination node ("Dest") N2, the source node ("Src") N6, the type of control packet ("Type"), which is set to "Response", a forward predicted delay time Rml1 from the destination node N2 to the source node N6, and a backward predicted delay time Rml2 from the source node N6 to the destination node N2. The forward predicted delay time Rml1 is 264 and the backward predicted delay time Rml2 is 0 at the time when the request packet is sent from the node N6.

After that, when one of the input ports 301 of the switch SW3 receives the response packet, the input port 301 outputs the response packet to the associated detection unit 303 (step S43). Upon detecting the receipt of the response packet, the detection unit 303 outputs the data of the response packet to the control packet processing unit 305. Upon receiving the response packet, the control packet processing unit 305 performs a response packet process on the response packet (step S45). The response packet process will be described with reference to FIGS. 17 and 18.

Figure 17:
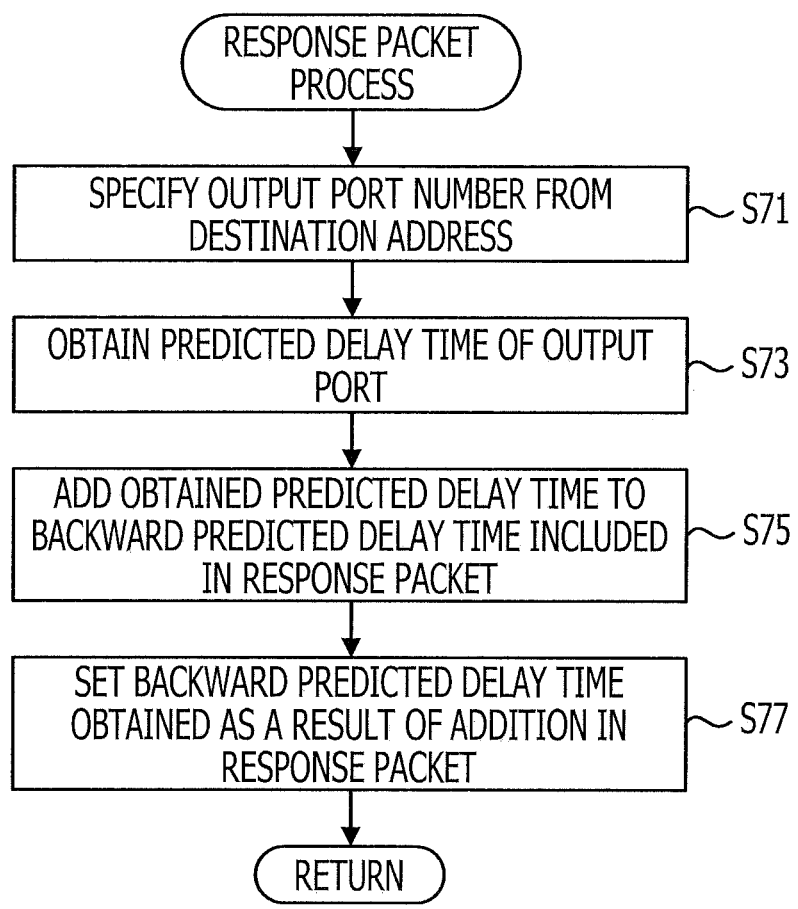
FIG. 17 is a diagram illustrating a process flow of a response packet process.

First, the control packet processing unit 305 specifies an output port number of one of the output ports 309 from which the response packet is to be output, from the destination address of the response packet (FIG. 17: step S71). For example, the number of one of the output ports 309 corresponding to the destination address may be obtained from the switching unit 307. Then, the control packet processing unit 305 reads the predicted delay time of the specified output port 309 from the delay DB 311 (step S73). After that, the control packet processing unit 305 adds the obtained predicted delay time to the backward predicted delay time Rml2 included in the response packet (step S75). For example, if the backward predicted delay time Rml2, which is 0, and the predicted delay time is "72", the result of addition is "72".

Then, the control packet processing unit 305 sets the backward predicted delay time obtained as a result of addition in the response packet (step S77). In this example, as illustrated in FIG. 18, the backward predicted delay time Rml2 is set to 72. Then, the process returns to the process illustrated in FIG. 15.

Referring back to FIG. 15, the control packet processing unit 305 outputs the processed response packet to the switching unit 307, and the switching unit 307 outputs the processed response packet to a corresponding one of the output ports 309. The output port 309 stores the response packet in a desired one of the output queues 3093 as a packet having a normal priority. After that, the output control unit 3091 outputs an instruction to the output queue 3093 in a normal manner to output the response packet (step S47). Here, the switch SW2 is a switch to which the response packet is to be output.

The switch SW2 receives the response packet from the switch SW3 (step S49), performs a response packet process on the response packet (step S51), and outputs a processed response packet from a corresponding one of the output ports 309 (step S53). Steps S49, S51, and S53 are similar to steps S43, S45, and S47 performed by the switch SW3, respectively, and a detailed description thereof is thus omitted. The switch SW2 outputs the response packet to the switch SW1.

The switch SW1 receives the response packet from the switch SW2 (step S55). The process proceeds to a process illustrated in FIG. 19 via connector C.

Figure 19:
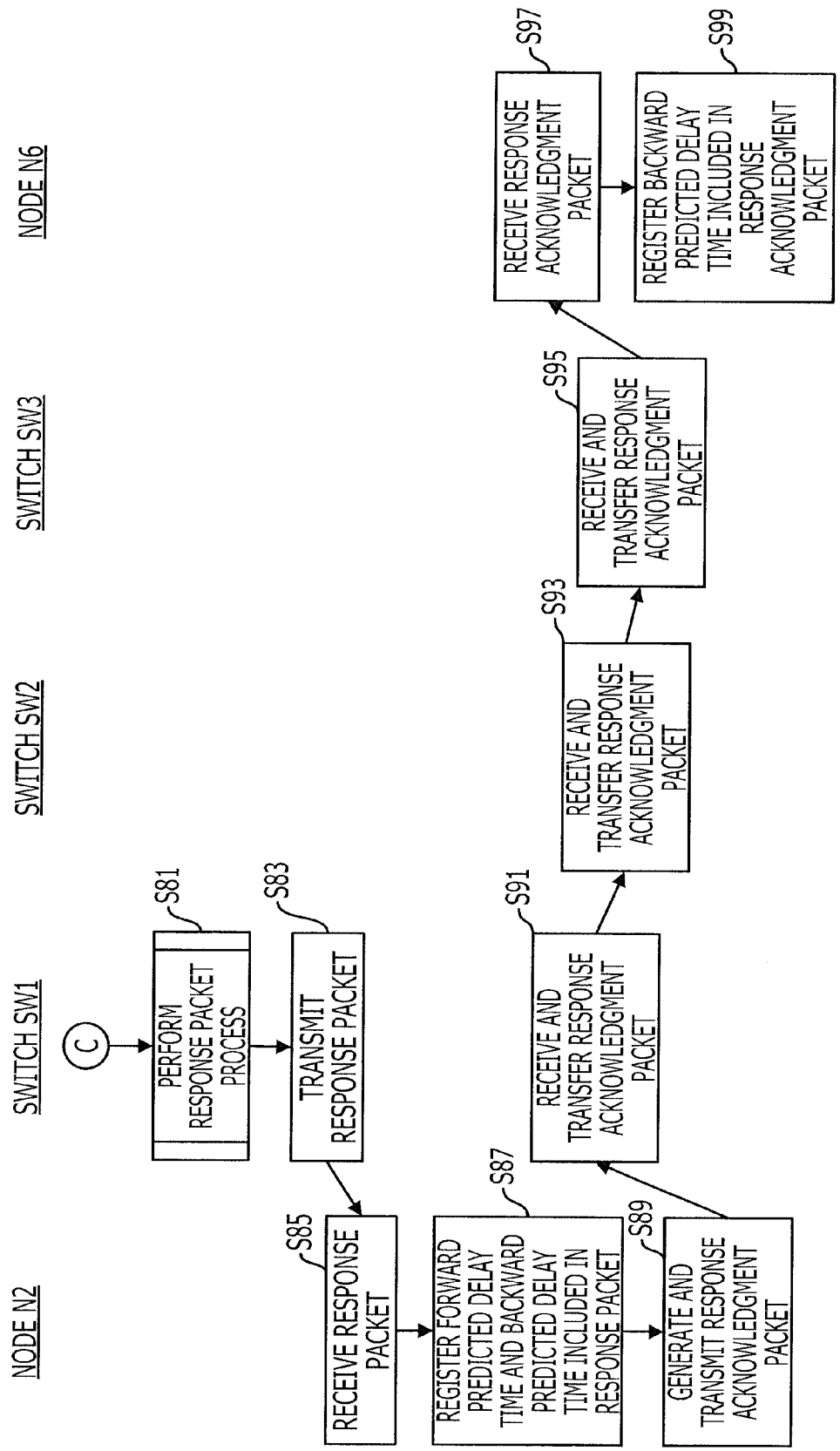
FIG. 19 is a diagram illustrating a process flow according to an embodiment.
Figure 21:
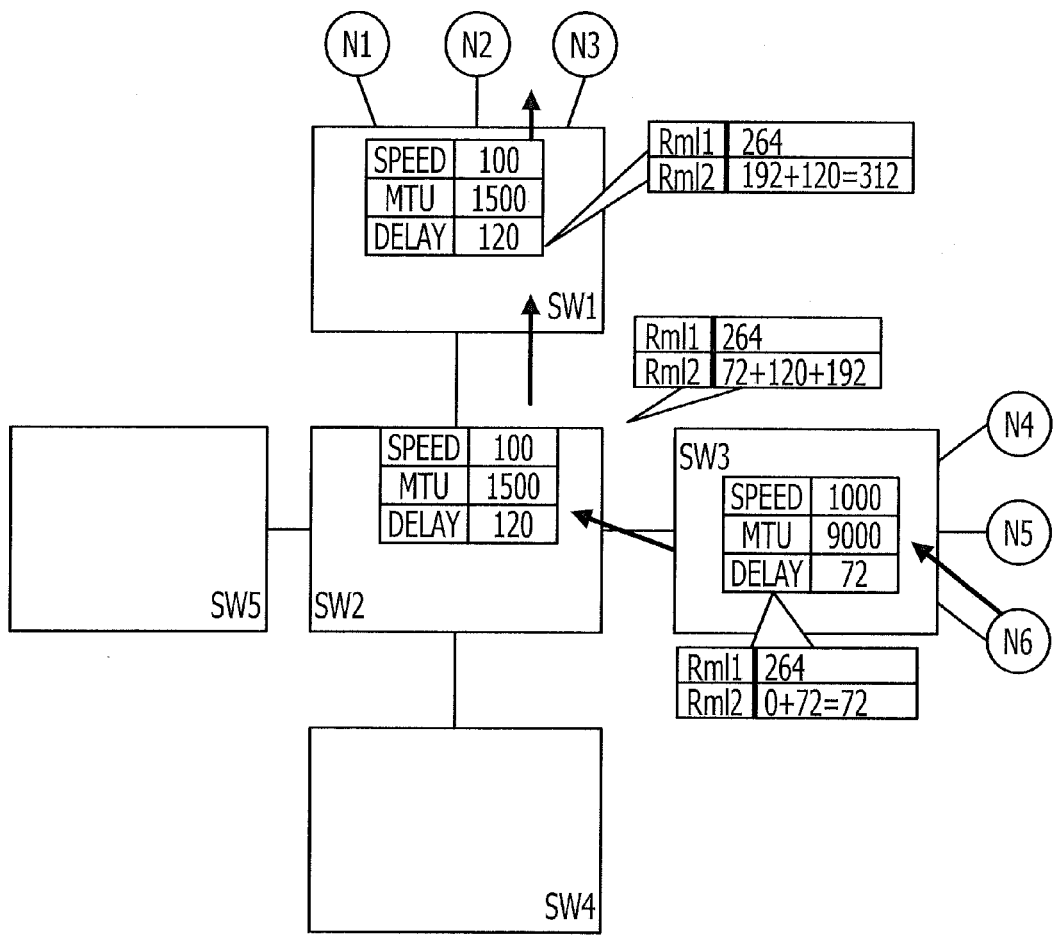
FIG. 21 is a diagram illustrating an overview of a process for a response packet.
Figure 23:
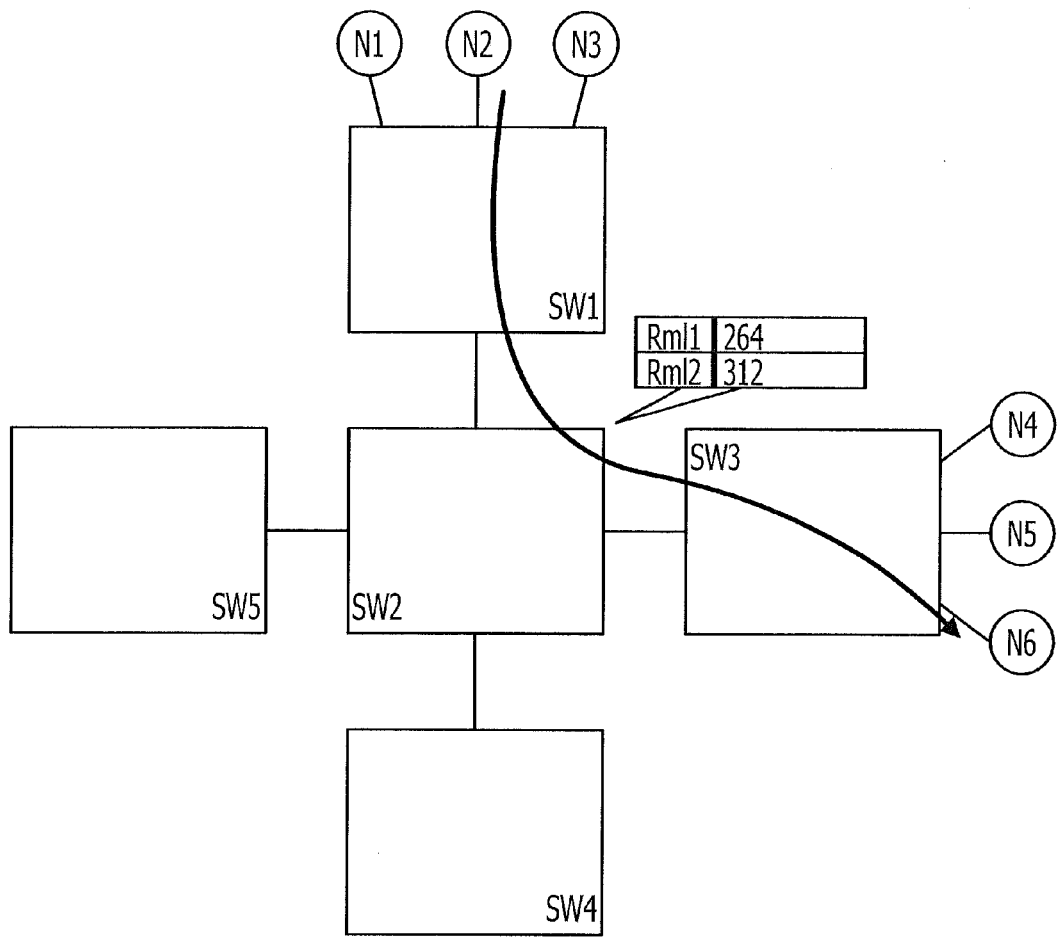
FIG. 23 is a diagram illustrating an overview of a process for a response acknowledgment packet.

Referring to FIG. 19, the switch SW1 performs a response packet process on the received response packet (step S81), and outputs a processed response packet from a corresponding one of the output ports 309 (step S83). Steps S55, S81, and S83 are also similar to steps S43, S45, and S47 performed by the switch SW3, respectively, and a detailed description thereof is thus omitted. The switch SW1 outputs the response packet to the node N2.

When the node N2 receives the response packet (step S85), the communication control unit 100 of the node N2 stores the value of the forward predicted delay time Rml1 and the value of the backward predicted delay time Rml2, which are included in the received response packet, in the first data storage unit 110 in association with the identifier of the source node (step S87).

For example, as illustrated in FIG. 20, the communication partner node, the direction, and the predicted delay time (also called a maximum predicted delay time) are stored in the first data storage unit 110. The value of the forward predicted delay time Rml1 included in the response packet represents a forward predicted delay time that is a delay time which will be incurred when a packet is transmitted to the node N6, and the direction contains "F" representing the forward direction. In addition, the value of the backward predicted delay time Rml2 included in the response packet represents a backward predicted delay time that is a delay time which will be incurred when a packet is received from the node N6, and the direction contains "B" representing the backward direction.

An overview of the above process will be described again with reference to FIG. 21. A response packet output from the node N6 contains the backward predicted delay time Rml2, which is 0, and the forward predicted delay time Rml1, which is 264. When the response packet reaches the switch SW3, the predicted delay time Delay, which is 72, is added to the backward predicted delay time Rml2, and the response packet containing the backward predicted delay time Rml2 obtained as a result of addition, which is 72, is output. When the response packet reaches the switch SW2, the predicted delay time Delay, which is 120, is added to the backward predicted delay time Rml2, which is 72, and the response packet containing the backward predicted delay time Rml2 obtained as a result of addition, which is 192, is output. Further, when the response packet reaches the switch SW1, the predicted delay time Delay, which is 120, is added to the backward predicted delay time Rml2, which is 192, and the response packet containing the backward predicted delay time Rml2 obtained as a result of addition, which is 312, is output. In this manner, the node N2 is notified of the forward predicted delay time Rml1, which is 264, and the backward predicted delay time Rml2, which is 312. As described above, the communication control unit 100 of the node N2 stores the forward predicted delay time Rml1 and the backward predicted delay time Rml2 as the forward predicted delay time and the backward predicted delay time for transmission to the node N6, respectively, in the first data storage unit 110.

Figure 22:
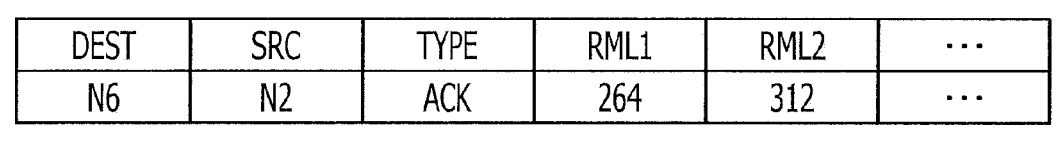

After that, the communication control unit 100 of the node N2 generates a response acknowledgment packet including the backward predicted delay time Rml2, and transmits the response acknowledgment packet to the node N6 (step S89). Specifically, the response acknowledgment packet is output to the switch SW1. For example, a response acknowledgment packet illustrated in FIG. 22 is output. In the example illustrated in FIG. 22, the response acknowledgment packet contains the destination node ("Dest") N6, the source node ("Src") N2, the type of control packet ("Type"), which is set to "Ack" representing a response acknowledgment packet, a forward predicted delay time Rml1 for the source node N2 (i.e., the backward predicted delay time for the destination node N6), and a backward predicted delay time Rml2 for the source node N2 (i.e., the forward predicted delay time for the destination node N6).

When one of the input ports 301 of the switch SW1 receives the response acknowledgment packet, the input port 301 outputs the response acknowledgment packet to the associated detection unit 303. Upon detecting the receipt of the response acknowledgment packet, the detection unit 303 outputs the response acknowledgment packet to the control packet processing unit 305. If the control packet processing unit 305 determines that the received packet is a response acknowledgment packet, the control packet processing unit 305 outputs the response acknowledgment packet to the switching unit 307 as it is because no processes are to be performed on the response acknowledgment packet. The switching unit 307 outputs the response acknowledgment packet to a corresponding one of the output ports 309. The output port 309 stores the response acknowledgment packet in a desired one of the output queues 3093 as a packet having a normal priority. After that, the output control unit 3091 outputs an instruction to the output queue 3093 in a normal manner to output the response acknowledgment packet from the output unit 3092 (step S91). Here, the switch SW2 is a switch to which the response acknowledgment packet is to be output. The response acknowledgment packet may not necessarily be regarded as a control packet.

Upon receiving the response acknowledgment packet, the switch SW2 performs a process similar to that of the switch SW1, and transmits the response acknowledgment packet to the switch SW3 (step S93). Upon receiving the response acknowledgment packet, the switch SW3 performs a process similar to that of the switch SW1, and transmits the response acknowledgment packet to the destination, that is, the node N6 (step S95). Upon receiving the response acknowledgment packet (step S97), the communication control unit 200 of the node N6 stores the value of the backward predicted delay time Rml2 included in the response acknowledgment packet in the first data storage unit 210 as the forward predicted delay time for the node N2 in association with the source node N2 (step S99). In the example illustrated in FIG. 13, the data in the second row is registered.

An overview of the above process will be described again with reference to FIG. 23. That is, a response acknowledgment packet is transmitted along a path indicated by an arrow in FIG. 23, and the node N6 is newly notified of the data of the backward predicted delay time Rml2. No special processes are performed by switches located along the communication path of the response acknowledgment packet.

The above process allows both the nodes N2 and N6 to share the forward predicted delay time Rml1 used for the transmission of a real-time packet from the node N2 to the node N6 and the backward predicted delay time Rml2 used for the transmission of a real-time packet from the node N6 to the node N2.

Next, a process for transmitting a real-time packet will be described with reference to FIGS. 24 to 34. First, a description will be given of forward transmission performed when, for example, a control value is output from the controller 130 to the actuator 240 via a real-time packet.

In this embodiment, forward transmission is performed by sending a preliminary indication packet (also referred to as a trial packet) a time equal to the forward predicted delay time before the timing of transmitting a real-time packet. That is, the communication control unit 100 of the node N2 generates a preliminary indication packet including the forward predicted delay time, a time equal to the forward predicted delay time before the timing of transmitting a real-time packet, and transmits the preliminary indication packet to the node N6 (step S101). Specifically, the preliminary indication packet is forwarded to the switch SW1. The value obtained by adding the transmission delay time to the forward predicted delay time may be set as a control time, which will be described in detail below.

As described below, the preliminary indication packet is used to prepare each switch located along a path for the transfer of a real-time packet, and is transmitted a time equal to the forward predicted delay time before the transmission of the real-time packet. The reason for this is that even if the preliminary indication packet is a packet having a high priority, a time equal to the forward predicted delay time may be taken, at most, for the preliminary indication packet to reach the destination, that is, the node N6. If the time interval between the transmission of the preliminary indication packet and the transmission of the real-time packet becomes less than the forward predicted delay time, a switch nearer the destination node among the switches located along the path may not have completed preparation. In order to avoid this inconvenience, the preliminary indication packet is transmitted a time equal to the forward predicted delay time before the transmission of the real-time packet.

For example, a preliminary indication packet illustrated in FIG. 25 is sent. In the example illustrated in FIG. 25, the destination node ("Dest") N6, the source node ("Src") N2, the type of control packet ("Type"), which is set to "Forward" representing a preliminary indication packet, a flag Fdir representing the transmission direction of the real-time packet, which is set to 0 (0 represents forward transmission and 1 represents backward transmission), and a control time Pause for a switch located along the path, which is set to 264. Here, the value of the control time Pause is equal to the forward predicted delay time. However, as described below, the value of the control time Pause may be changed along the path or may be adjusted by the source node.

Then, as described above, the communication control unit 100 of the node N2 waits for a time equal to the forward predicted delay time (step S103). When a time equal to the forward predicted delay time has elapsed, the communication control unit 100 generates a real-time packet from, for example, data generated by the controller 130 and stored in the second data storage unit 120, and transmits the real-time packet to the node N6 (step S105). Specifically, the real-time packet is forwarded to the switch SW1.

Next, a process for the preliminary indication packet will be described with reference to FIGS. 26 to 29. When one of the input ports 301 of the switch SW1 receives the preliminary indication packet (step S111), the input port 301 outputs the preliminary indication packet to the associated detection unit 303. Upon detecting the receipt of a preliminary indication packet that is a control packet, the detection unit 303 outputs the data of the preliminary indication packet to the control packet processing unit 305. Upon receiving the data of the preliminary indication packet from the detection unit 303, the control packet processing unit 305 performs a preliminary indication packet process on the data of the preliminary indication packet (step S113). The preliminary indication packet process will be described with reference to FIG. 27.

The control packet processing unit 305 determines from the Fdir flag of the preliminary indication packet whether or not forward transmission is to occur (step S131). If forward transmission is to occur, the control packet processing unit 305 specifies a corresponding one of the output ports 309 from the destination address (or identification information about the destination node) of the preliminary indication packet, and sets the specified output port 309 as a control target output port CP (step S133). Then, the process proceeds to step S137. If backward transmission is to occur, the control packet processing unit 305 sets, as a control target output port CP, one of the output ports 309 corresponding to one of the input ports 301 through which the preliminary indication packet has been received (or one of the output ports 309 that is specified from the source address (or from identification information about the source node)) (step S135), although backward transmission will not be described in detail here. Then, the process proceeds to step S137.

In step S137, the control packet processing unit 305 controls the control target output port CP to stop the output of packets from the output queue 3093b used for low-priority packets (step S137). In a basic method, the control packet processing unit 305 instructs the output control unit 3091 of the control target output port CP to stop the output of packets from the output queue 3093b used for low-priority packets for a time period given by adding the forward predicted delay time included in the preliminary indication packet to the transmission delay time registered in the delay DB 311 in association with the combination of source and destination nodes. In accordance with the instruction, the output control unit 3091 stops the output of packets from the output queue 3093b for a time period given by (transmission delay time+forward predicted delay time). After that, the process returns to the main process. The state of the output control unit 3091 is returned to a normal state when the above time period has elapsed.

Referring back to FIG. 26, the control packet processing unit 305 of the switch SW1 outputs the preliminary indication packet to the switching unit 307, and the switching unit 307 outputs the preliminary indication packet to a corresponding one of the output ports 309. The output port 309 stores the preliminary indication packet in the output queue 3093a used for packets having a high priority. When the transmission order is reached, the output port 309 reads the preliminary indication packet from the output queue 3093a, and outputs the preliminary indication packet from the output unit 3092 (step S115). Here, the preliminary indication packet is transmitted to the switch SW2.

Upon receiving the preliminary indication packet (step S117), similarly to the switch SW1, the switch SW2 performs a preliminary indication packet process (step S119). After that, the switch SW2 transmits the preliminary indication packet to the switch SW3 (step S121). Similarly to the switch SW1, the switch SW2 stops the output of packets from the output queue 3093b used for low-priority packets for a time period given by (transmission delay time+forward predicted delay time).

Upon receiving the preliminary indication packet (step S123), similarly to the switch SW2, the switch SW3 performs a preliminary indication packet process (step S125). After that, the switch SW3 outputs the preliminary indication packet to the node N6 (step S127). Similarly to the switch SW1, the switch SW3 also stops the output of packets from the output queue 3093b used for low-priority packets for a time period given by (transmission delay time+forward predicted delay time). The node N6 receives the preliminary indication packet from the switch SW3 (step S129), and is capable of recognizing that a real-time packet will be transmitted soon, from the Fdir flag of the preliminary indication packet.

Figure 28:
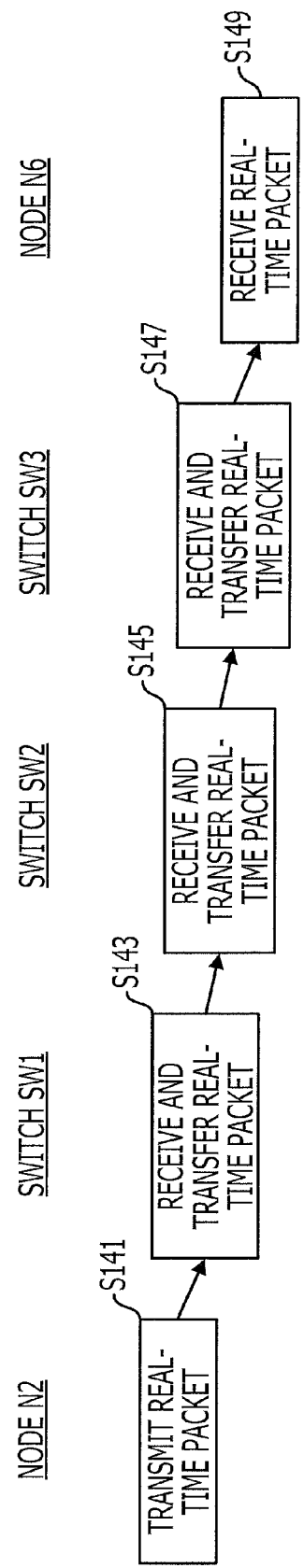
FIG. 28 is a diagram illustrating a process flow for the transmission of a real-time packet in case of forward transmission.

As described with reference to FIG. 24, the node N2 transmits a real-time packet that is a data packet to the node N6 when a time equal to the forward predicted delay time has elapsed since the preliminary indication packet was transmitted. The real-time packet is transmitted as a packet having a high priority. In this case, as illustrated in FIG. 28, the node N2 transmits a real-time packet (step S141), and one of the input ports 301 of the switch SW1 receives the real-time packet. Since the real-time packet is a data packet, the associated one of the detection units 303 outputs the real-time packet to the switching unit 307, and the switching unit 307 specifies one of the output ports 309 from the destination address etc., and outputs the real-time packet to the specified output port 309. The specified output port 309 is identical to that for the preliminary indication packet. Upon receiving the real-time packet, the output port 309 stores the real-time packet in the output queue 3093a used for high-priority packets. Since a packet is preferentially output from the output queue 3093a, it is probable that the output queue 3093a will have become empty when the real-time packet reaches the output queue 3093a. Thus, the real-time packet is immediately read from the output queue 3093a, and is output from the output unit 3092. That is, the real-time packet is transmitted to the switch SW2 (step S143).

Upon receiving the real-time packet, the switch SW2 performs a process similar to that of the switch SW1, and transfers the real-time packet to the switch SW3 (step S145). Upon receiving the real-time packet, the switch SW3 performs a process similar to that of the switch SW1, and transfers the real-time packet to the node N6 (step S147). Upon receiving the real-time packet, the communication control unit 200 of the node N6 stores the data of the real-time packet in the second data storage unit 220 (step S149). After that, for example, the actuator 240 performs a given operation using the data of the real-time packet stored in the second data storage unit 220.

In this manner, each of the switches SW1 to SW3 is allowed to transfer a real-time packet during a period during which the output of packets from the output queue 3093b used for low-priority packets is stopped. Thus, collisions with non-real-time packets can be avoided. That is, it is possible to deliver a real-time packet to the destination node for a very short transmission time.

Figure 29:
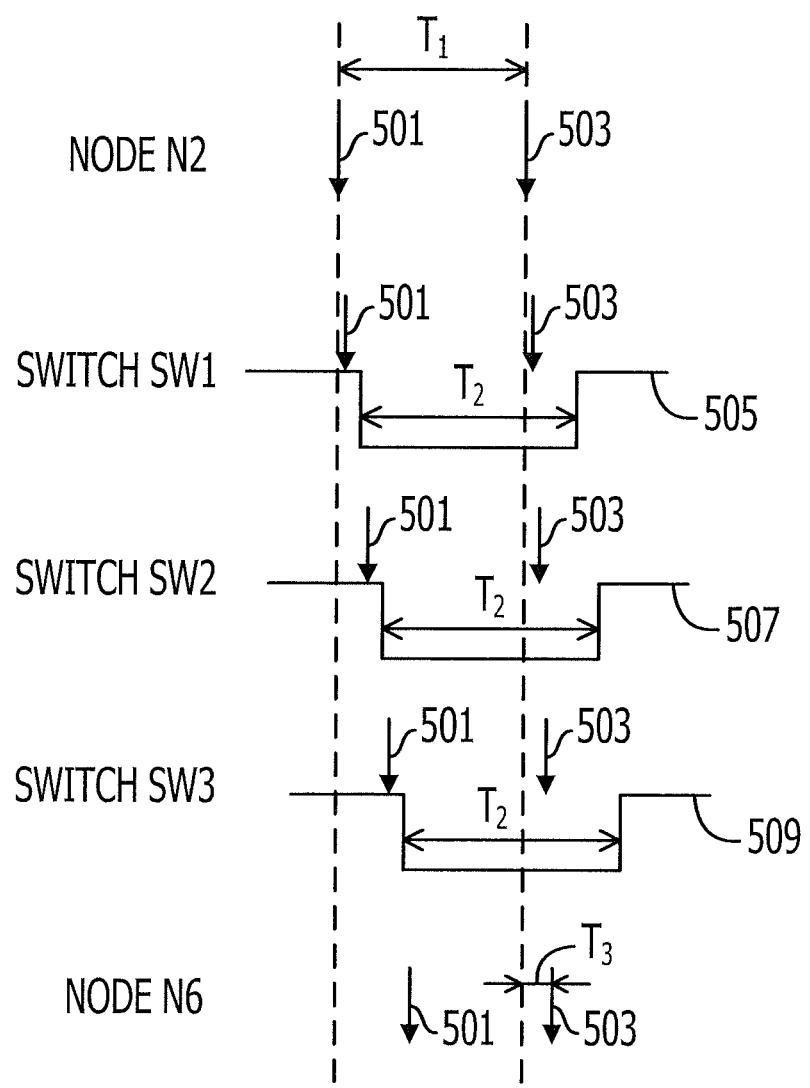
FIG. 29 is a diagram illustrating a transmission timing of a preliminary indication packet and a real-time packet in case of forward transmission.

The timings in the process described above will be described with reference to FIG. 29. In FIG. 29, a preliminary indication packet and a real-time packet are transmitted from the node N2 illustrated at the top to the switch SW1, the switch SW2, the switch SW3, and the node N6 in this order, and time passes from left to right. An arrow 501 represents a preliminary indication packet, and an arrow 503 represents a real-time packet. The direction of the arrows 501 and 503 is identical to the transmission direction of the corresponding packets, and indicates forward transmission in which the preliminary indication packet and the real-time packet are transmitted from the node N2 to the node N6. As described above, the node N2 outputs the preliminary indication packet 501 a time equal to a forward predicted delay time $T_1$ before the real-time packet 503 is transmitted. The preliminary indication packet 501 may collide with other packets, and a certain amount of delay occurs in each of the switches SW1 to SW3. Upon receiving the preliminary indication packet 501, each of the switches SW1 to SW3 performs the process described above, and stops the output of packets from the output queue 3093b used for low-priority packets, for a time period $T_2$ given by (forward predicted delay time+transmission delay time from the node N2 to the node N6). In the switch SW1, as indicated by a signal 505, the output of low-priority packets is stopped for the time period $T_2$ during which the level of the signal 505 is low. Similarly, in the switch SW2, as indicated by a signal 507, the output of low-priority packets is stopped for the time period $T_2$ during which the level of the signal 507 is low. Further, in the switch SW3, as indicated by a signal 509, the output of low-priority packets is stopped for the time period $T_2$ during which the level of the signal 509 is low. Thus, the real-time packet 503 reaches each of the switches SW1 to SW3 within a time period during which the level of a signal indicating a time period during which the output of low-priority packets is stopped is low, and collisions with non-real-time packets are avoided. That is, the real-time packet 503 reaches the node N6 with a delay time as low as approximately a time period $T_3$. The time period $T_3$ corresponds to the transmission delay time from the node N2 to the node N6.

Figure 30:
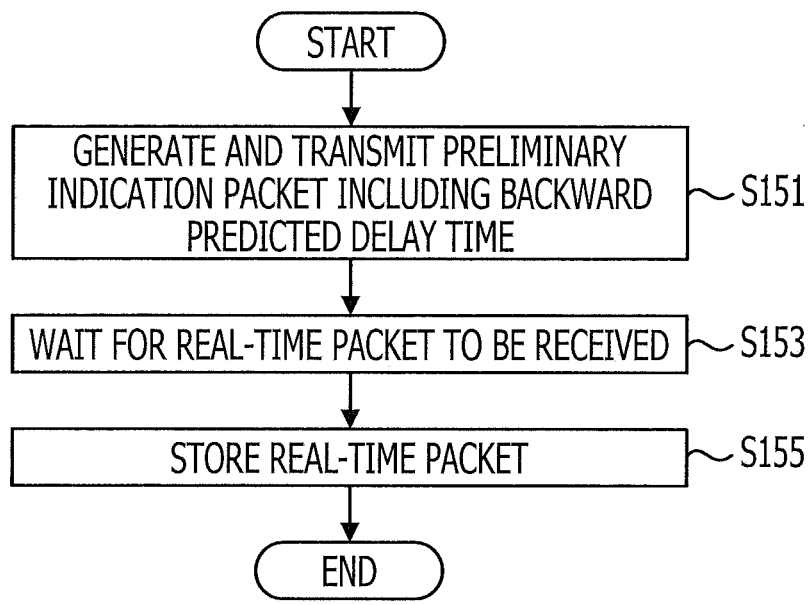
FIG. 30 is a diagram illustrating a process of a node from which a preliminary indication packet is transmitted in case of backward transmission.

Next, a case where, for example, measurement data obtained by measuring a physical quantity or the like using the sensor 230 of the node N6 per unit time is acquired by the controller 130 of the node N2, that is, backward transmission, will be described with reference to FIGS. 30 to 33. First, the communication control unit 100 of the node N2 generates a preliminary indication packet including a backward predicted delay time a time equal to the backward predicted delay time before the timing when, for example, the node N6 transmits a real-time packet, and transmits the preliminary indication packet to the node N6 (FIG. 30: step S151). For example, a preliminary indication packet having a header illustrated in FIG. 31 is transmitted. In the example illustrated in FIG. 31, the preliminary indication packet contains the destination node ("Dest") N6, the source node ("Src") N2, the type of control packet ("Type"), which is set to "Forward" (representing a preliminary indication packet), a flag Fdir representing the transmission direction of a real-time packet to be transmitted, which is set to 1, and a control time Pause for a switch located along the path, which is set to 312. Here, the value of the control time Pause is equal to the backward predicted delay time. However, as described below, the value of the control time Pause may be changed along the path. In addition, as described below, the value given by (backward predicted delay time+transmission delay time from the node N6 to the node N2) may be transmitted.

Then, the communication control unit 100 of the node N2 waits for a real-time packet to be received (step S153). After that, the communication control unit 100 of the node N2 receives a real-time packet from the switch SW1, and stores the data of the real-time packet in the second data storage unit 120 (step S155). The controller 130 of the node N2 retrieves the received data of the real-time packet from the second data storage unit 120, and processed the retrieved data.

Figure 26:
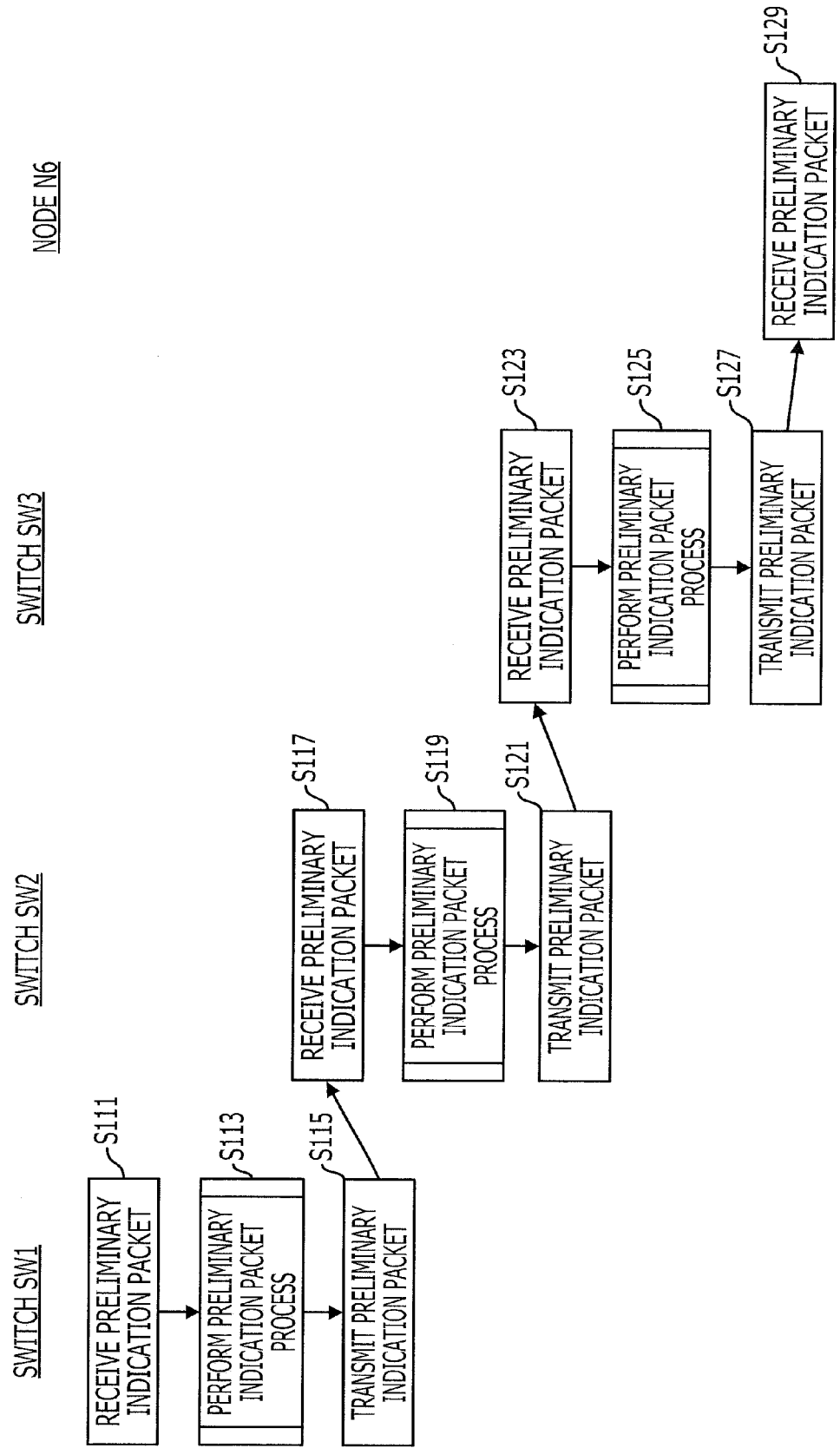
FIG. 26 is a diagram illustrating a process for a preliminary indication packet.
Figure 27:
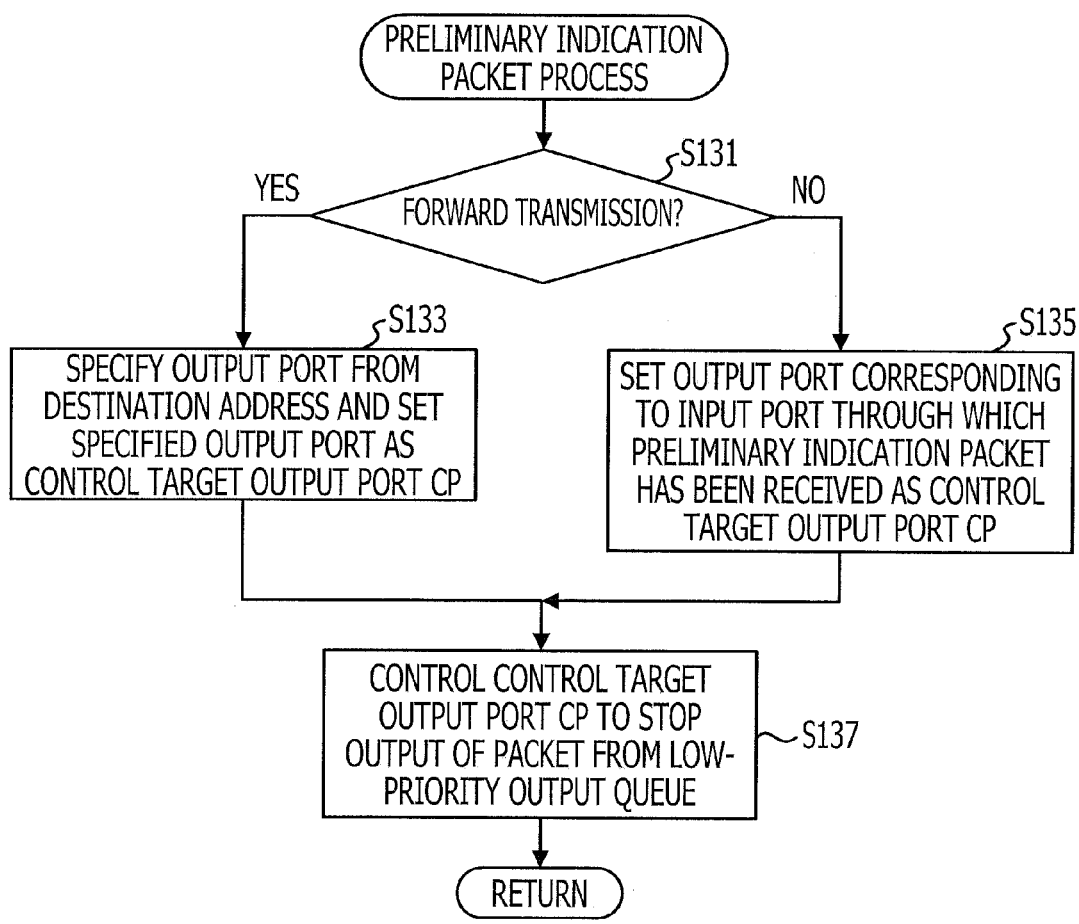
FIG. 27 is a diagram illustrating a process flow of a preliminary indication packet process.

The flow of the process performed by the switches SW1 to SW3 is as illustrated in FIG. 26, and the process performed in each of the switches SW1 to SW3 is as illustrated in FIG. 27. In step S137, however, the time period during which the output of low-priority packets is to be stopped is set using the backward predicted delay time instead of using the forward predicted delay time.

Figure 32:
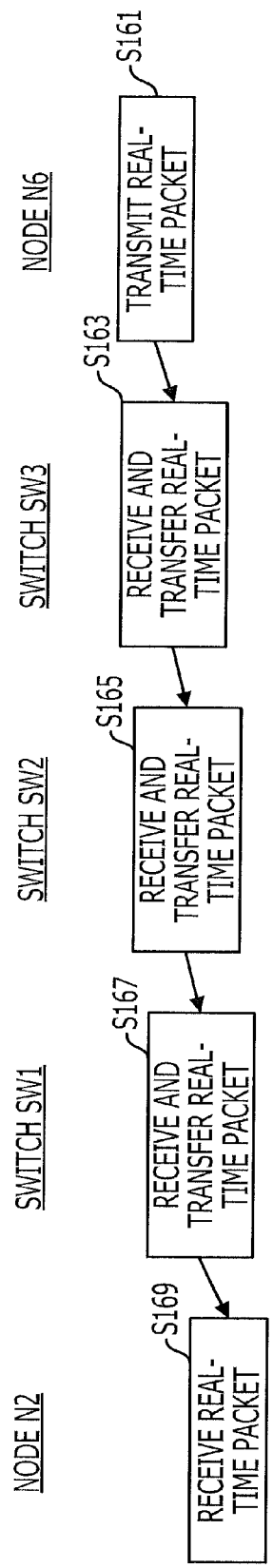
FIG. 32 is a diagram illustrating a process flow for the transmission of a real-time packet in case of backward transmission.

Instead of the operation illustrated in FIG. 28, a real-time packet transmission operation illustrated in FIG. 32 is performed. In case of backward transmission, the node N6 transmits a real-time packet, which is a data packet, to the node N2 at, for example, a predetermined timing. The real-time packet is transmitted as a packet having a high priority. In this case, as illustrated in FIG. 32, the node N6 transmits a real-time packet (step S161), and one of the input ports 301 of the switch SW3 receives the real-time packet. Since the real-time packet is a data packet, the associated one of the detection units 303 outputs the real-time packet to the switching unit 307. The switching unit 307 specifies one of the output ports 309 from the destination address etc., and outputs the real-time packet to the specified output port 309. The specified output port 309 is an output port corresponding to one of the input ports 301 through which the preliminary indication packet has been received. Upon receiving the real-time packet, the output port 309 stores the real-time packet in the output queue 3093a used for high-priority packets. Since a packet is preferentially output from the output queue 3093a, it is probable that the output queue 3093a will have become empty when the real-time packet reaches the output queue 3093a. Thus, the real-time packet is immediately read from the output queue 3093a, and is output from the output unit 3092. That is, the real-time packet is transmitted to the switch SW2 (step S163).

Upon receiving the real-time packet, the switch SW2 performs a process similar to that of the switch SW3, and transfers the real-time packet to the switch SW1 (step S165). Upon receiving the real-time packet, the switch SW1 performs a process similar to that of the switch SW3, and transfers the real-time packet to the node N2 (step S167). Upon receiving the real-time packet, the communication control unit 100 of the node N2 stores the data of the real-time packet in the second data storage unit 120 (step S169). After that, for example, the controller 130 performs a given process using the data of the real-time packet stored in the second data storage unit 120.

In this manner, each of the switches SW1 to SW3 is allowed to transfer a real-time packet during a period during which the output of packets from the output queue 3093b used for low-priority packets is stopped. Thus, collisions with non-real-time packets can be avoided. That is, it is possible to deliver a real-time packet to the destination node for a very short transmission time.

Figure 33:
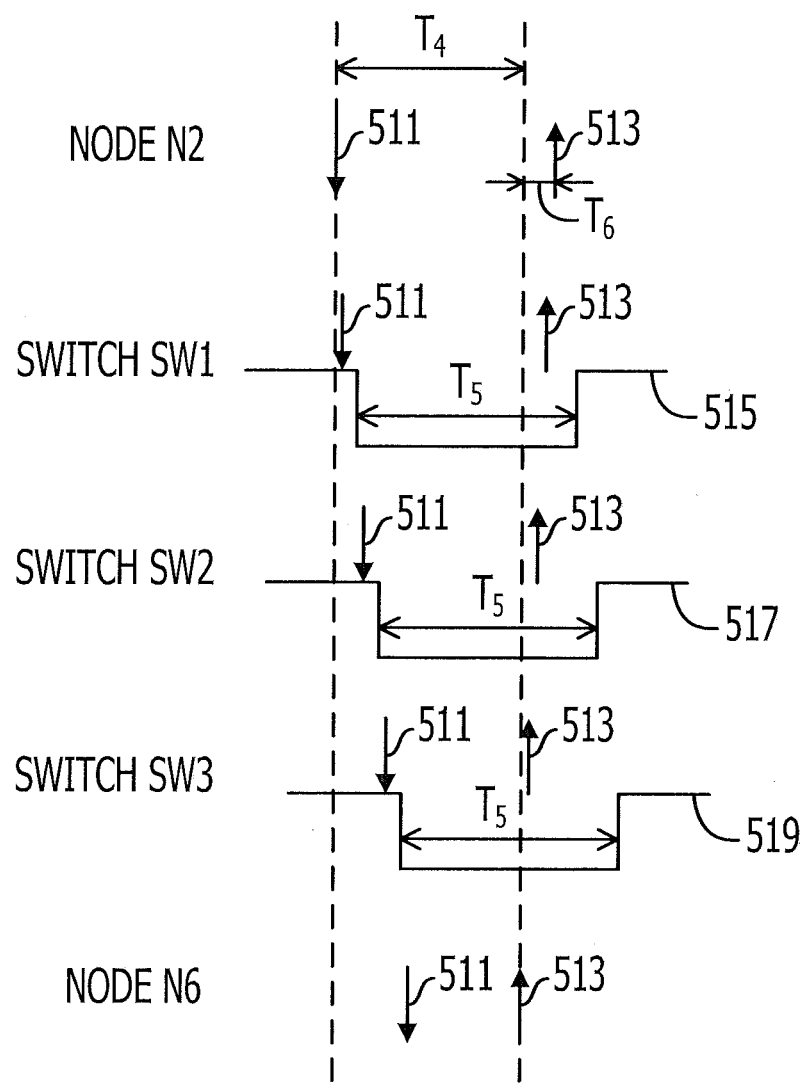
FIG. 33 is a diagram illustrating a transmission timing of a preliminary indication packet and a real-time packet in case of backward transmission.

The timings in the process in case of backward transmission will be described with reference to FIG. 33. In FIG. 33, a preliminary indication packet is transmitted from the node N2 illustrated at the top to the switch SW1, the switch SW2, the switch SW3, and the node N6 in this order, and time passes from left to right. An arrow 511 represents a preliminary indication packet, and an arrow 513 represents a real-time packet. The direction of the arrows 511 and 513 is identical to the transmission direction of the corresponding packets. The preliminary indication packet is transmitted from the node N2 to the node N6, and the real-time packet is transmitted from the node N6 to the node N2, thereby indicating that backward transmission is to occur. As described above, the node N2 outputs the preliminary indication packet 511 a time equal to a backward predicted delay time $T_4$ before the real-time packet 513 is transmitted. The preliminary indication packet 511 may collide with other packets, and a certain amount of delay occurs in each of the switches SW1 to SW3. Upon receiving the preliminary indication packet 511, each of the switches SW1 to SW3 performs the process described above, and stops the output of packets from the output queue 3093b used for low-priority packets, for a time period $T_5$ given by (backward predicted delay time+transmission delay time from the node N6 to the node N2). In the switch SW1, as indicated by a signal 515, the output of low-priority packets is stopped for a time period $T_5$ during which the level of the signal 515 is low. Similarly, in the switch SW2, as indicated by a signal 517, the output of low-priority packets is stopped for a time period $T_5$ during which the level of the signal 517 is low. Further, in the switch SW3, as indicated by a signal 519, the output of low-priority packets is stopped for a time period $T_5$ during which the level of the signal 519 is low. Thus, the real-time packet 513 reaches each of the switches SW1 to SW3 within a time period during which the level of a signal indicating a time period during which the output of low-priority packets is stopped is low, and collisions with non-real-time packets are avoided. That is, the real-time packet 513 reaches the node N2 with a delay time as low as approximately time $T_6$. The time $T_6$ corresponds to the transmission delay time from the node N6 to the node N2.

The above process allows a real-time packet to be transmitted to the destination node with a low delay.

In order to stop the output of low-priority packets, for example, each of the switches SW1 to SW3 located along the path may transmit a congestion notification CN, which is defined in IEEE 802.1Qau, to the source of the low-priority packet whose output is to be stopped. The congestion notification CN is distributed up to the source node, and therefore the source node transmits packets to other destinations instead of transmitting a packet to a destination with the output port from which the output of packets is being stopped. Thus, transmission of unnecessary packets may be reduced, resulting in efficient use of network bandwidth.

In addition, if the time period during which the output of packets is stopped increases, network communication efficiency is reduced. Thus, it is preferable that the time period during which the output of packets is stopped be as short as possible. For example, in a first modification, the forward predicted delay time or backward predicted delay time included in the preliminary indication packet may be reduced by an amount equal to the difference between the reception time of the preliminary indication packet and the transmission time of the preliminary indication packet at the subject switch, before the preliminary indication packet is transmitted. The reasons for this are as follows.

To begin with, the forward predicted delay time or the backward predicted delay time is a time period from when a preliminary indication packet is transmitted to when a real-time packet is transmitted, and the time taken for a switch located nearer the destination node of the preliminary indication packet to transmit the real-time packet is shorter. Specifically, the time taken in the switch SW2 is reduced by the difference time at the switch SW1, and the time taken in the switch SW3 is reduced by the sum of the difference times at the switches SW1 and SW2. If the real-time packet has no delay at all, it is sufficient that the output of low-priority packets be stopped at the transmission time of the real-time packet, and therefore the output of low-priority packets may be stopped for a time period as short as the time period given by subtracting a difference time between each of the switches SW1 to SW3 and the preceding switch from the forward predicted delay time or the backward predicted delay time. However, the transmission of the real-time packet involves a delay, and the delay is compensated for with the transmission delay time.

Figure 34:
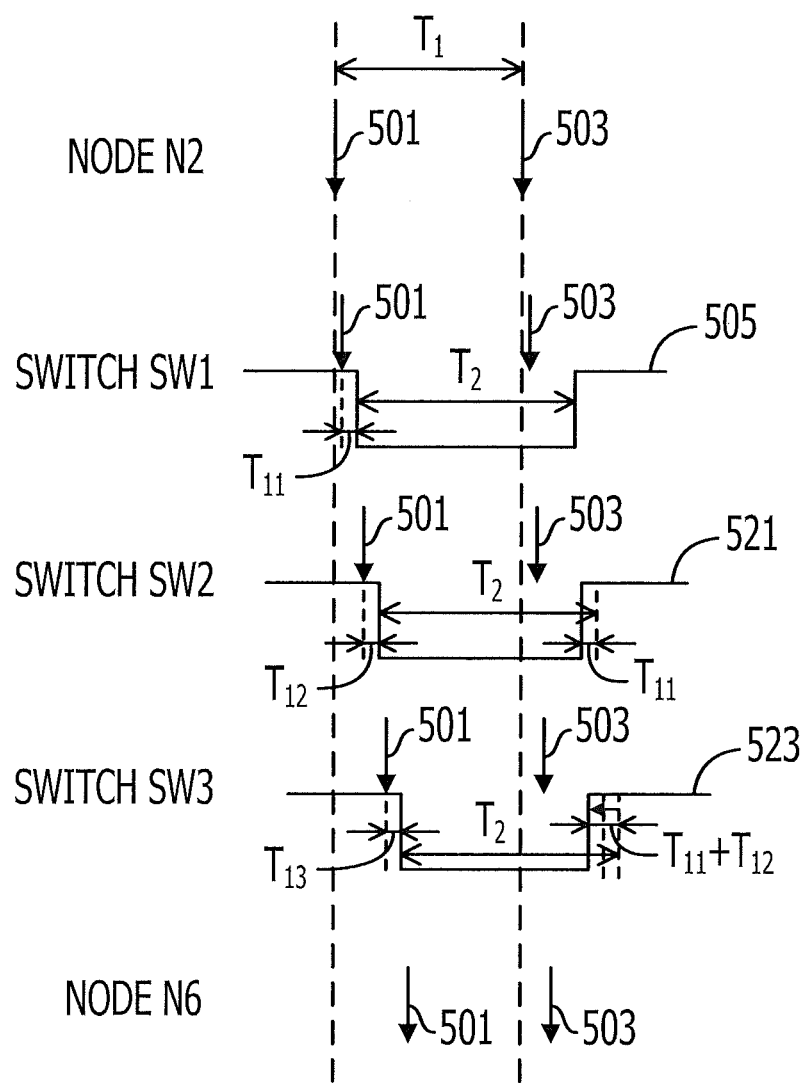
FIG. 34 is a diagram illustrating a transmission timing of a preliminary indication packet and a real-time packet in case of forward transmission according to a first modification.

The timings in the process in case of forward transmission will be described with reference to, for example, FIG. 34. In FIG. 34, a preliminary indication packet and a real-time packet are transmitted from the node N2 illustrated at the top to the switch SW1, the switch SW2, the switch SW3, and the node N6 in this order, and time passes from left to right. An arrow 501 represents a preliminary indication packet, and an arrow 503 represents a real-time packet. The direction of the arrows 501 and 503 is identical to the transmission direction of the corresponding packets, and indicates forward transmission in which the preliminary indication packet and the real-time packet are transmitted from the node N2 to the node N6. As described above, the node N2 outputs the preliminary indication packet 501 a time equal to a forward predicted delay time $T_1$ before the real-time packet 503 is transmitted. The preliminary indication packet 501 may collide with other packets, and a certain amount of delay occurs in each of the switches SW1 to SW3. The above description is substantially the same as that of FIG. 29.

As in FIG. 29, upon receiving the preliminary indication packet 501, the switch SW1 performs the process described above, and stops the output of packets from the output queue 3093b used for low-priority packets, for a time period $T_2$ given by (forward predicted delay time+transmission delay time from the node N2 to the node N6). In the switch SW1, as indicated by a signal 505, the output of low-priority packets is stopped for the time period $T_2$ during which the level of the signal 505 is low.

In the first modification, the switch SW1 calculates a new control time by subtracting the difference time $T_{11}$ given by (predicted transmission time TSout of the preliminary indication packet 501−reception time TSin) from the control time (=forward predicted delay time) included in the received preliminary indication packet 501, and transmits to the switch SW2 the preliminary indication packet 501 in which the calculated control time has been set.

In the switch SW2, as indicated by a signal 521, the time period during which the level of the signal 521 is low is given by $T_2-T_{11}$, and the output of low-priority packets is stopped during this time period.

In this modification, furthermore, the switch SW2 calculates a new control time by subtracting the difference time $T_{12}$ given by (predicted transmission time TSout of the preliminary indication packet 501−reception time TSin) from the control time included in the received preliminary indication packet 501, and transmits to the switch SW3 the preliminary indication packet 501 in which the calculated control time has been set.

In the switch SW3, as indicated by a signal 523, the time period during which the level of the signal 523 is low is given by $T_2-T_{11}-T_{12}$, and the output of low-priority packets is stopped during this time period.

In the first modification, furthermore, the switch SW3 calculates a new control time by subtracting the difference time $T_{13}$ given by (predicted transmission time TSout of the preliminary indication packet 501−reception time TSin) from the control time included in the received preliminary indication packet 501, and transmits to the node N6 the preliminary indication packet 501 in which the calculated control time has been set.

Thus, the real-time packet 503 reaches each of the switches SW1 to SW3 within a time period during which the level of a signal indicating a time period during which the output of low-priority packets is stopped is low, and collisions with non-real-time packets are avoided.

Figure 35:
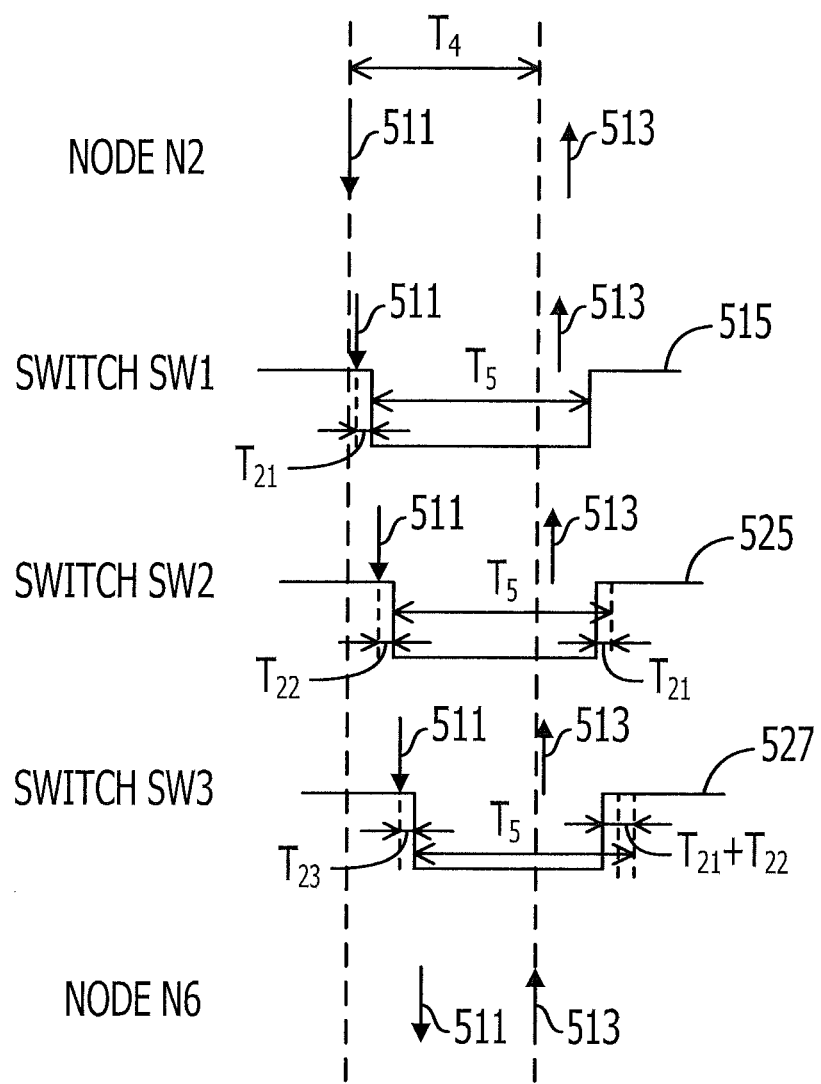
FIG. 35 is a diagram illustrating a transmission timing of a preliminary indication packet and a real-time packet in case of backward transmission according to the first modification.

Next, the timings in the process in case of backward transmission according to the first modification will be described with reference to FIG. 35. In FIG. 35, a preliminary indication packet 511 is transmitted from the node N2 illustrated at the top to the switch SW1, the switch SW2, the switch SW3, and the node N6 in this order, and time passes from left to right. An arrow 511 represents a preliminary indication packet, and an arrow 513 represents a real-time packet. The direction of the arrows 511 and 513 is identical to the transmission direction of the corresponding packets. The preliminary indication packet 511 is transmitted from the node N2 to the node N6, and the real-time packet 513 is transmitted from the node N6 to the node N2, thereby indicating that backward transmission is to occur. As described above, the node N2 outputs the preliminary indication packet 511 a time equal to a backward predicted delay time $T_4$ before the real-time packet 513 is transmitted. The preliminary indication packet 511 may collide with other packets, and a certain amount of delay occurs in each of the switches SW1 to SW3. The above description is substantially the same as that of FIG. 34.

As in FIG. 34, upon receiving the preliminary indication packet 511, the switch SW1 performs the process described above, and stops the output of packets from the output queue 3093b used for low-priority packets, for a time period $T_5$ given by (backward predicted delay time+transmission delay time from the node N6 to the node N2). In the switch SW1, as indicated by a signal 515, the output of low-priority packets is stopped for the time period $T_5$ during which the level of the signal 515 is low.

In the first modification, the switch SW1 calculates a new control time by subtracting the difference time $T_{21}$ given by (predicted transmission time TSout of the preliminary indication packet 511−reception time TSin) from the control time (=backward predicted delay time) included in the received preliminary indication packet 511, and transmits to the switch SW2 the preliminary indication packet 511 in which the calculated control time has been set.

In the switch SW2, as indicated by a signal 525, the time period during which the level of the signal 525 is low is given by $T_5-T_{21}$, and the output of low-priority packets is stopped during this time period.

In the first modification, furthermore, the switch SW2 calculates a new control time by subtracting the difference time $T_{22}$ given by (predicted transmission time TSout of the preliminary indication packet 511−reception time TSin) from the control time included in the received preliminary indication packet 511, and transmits to the switch SW3 the preliminary indication packet 511 in which the calculated control time has been set.

In the switch SW3, as indicated by a signal 527, the time period during which the level of the signal 527 is low is given by $T_5-T_{21}-T_{22}$, and the output of low-priority packets is stopped during this time period.

In the first modification, furthermore, the switch SW3 calculates a new control time by subtracting the difference time $T_{23}$ given by (predicted transmission time TSout of the preliminary indication packet 511−reception time TSin) from the control time included in the received preliminary indication packet 511, and transmits to the node N6 the preliminary indication packet 511 in which the calculated control time has been set.

Thus, the real-time packet 513 reaches each of the switches SW1 to SW3 within a time period during which the level of a signal indicating a time period during which the output of low-priority packets is stopped is low, and collisions with non-real-time packets are avoided.

Figure 36:
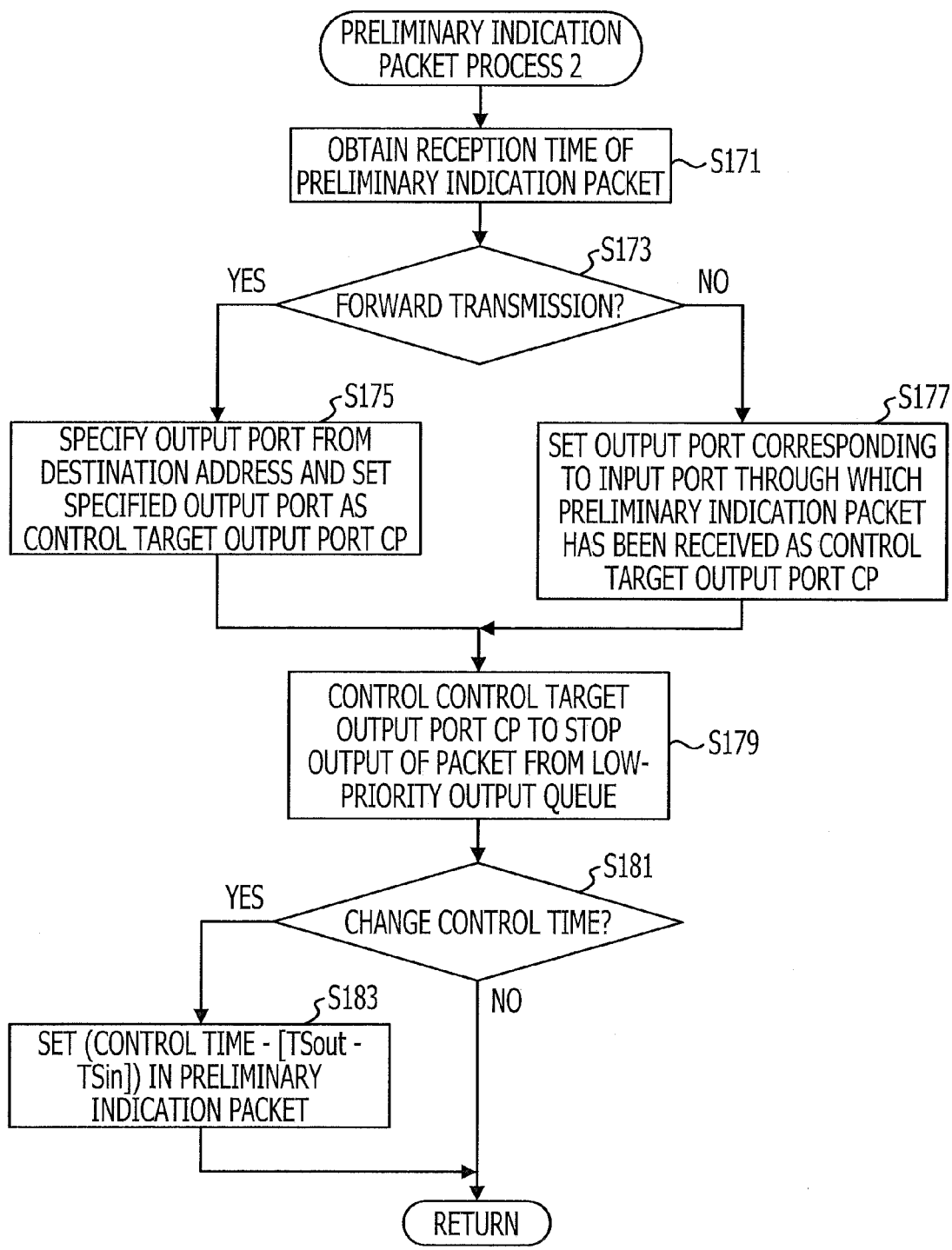
FIG. 36 is a diagram illustrating a process flow of a preliminary indication packet process according to the first modification.

In order to implement the above modification, a preliminary indication packet process illustrated in FIG. 36 is performed in place of the preliminary indication packet process illustrated in FIG. 27.

First, for example, if the received packet is a preliminary indication packet, the detection unit 303 obtains the reception time TSin, and outputs the data of the reception time TSin and the preliminary indication packet to the control packet processing unit 305 (FIG. 36: step S171).

Then, the control packet processing unit 305 determines from the Fdir flag of the preliminary indication packet whether or not forward transmission is to occur (step S173). If forward transmission is to occur, the control packet processing unit 305 specifies a corresponding one of the output ports 309 from the destination address (or, for example, identification information about the destination node) of the preliminary indication packet, and sets the specified output port 309 as a control target output port CP (step S175). Then, the process proceeds to step S179. If backward transmission is to occur, the control packet processing unit 305 sets, as a control target output port CP, one of the output ports 309 corresponding to one of the input ports 301 through which the preliminary indication packet has been received (or one of the output ports 309 that is specified from the source address (or from, for example, identification information about the source node)) (step S177). Then, the process proceeds to step S179.

In step S179, the control packet processing unit 305 controls the control target output port CP to stop the output of packets from the output queue 3093b used for low-priority packets (step S179). Also in the first modification, as with the basic method, the control packet processing unit 305 instructs the output control unit 3091 of the control target output port CP to stop the output of packets from the output queue 3093b used for low-priority packets for a time period given by adding the control time included in the preliminary indication packet to the transmission delay time registered in the delay DB 311 in association with the combination of source and destination nodes. In accordance with the instruction, the output control unit 3091 stops the output of packets from the output queue 3093b for a time period given by (transmission delay time+control time).

After that, the control packet processing unit 305 outputs the preliminary indication packet to the switching unit 307. The switching unit 307 specifies a corresponding one of the output ports 309 in accordance with the destination node of the preliminary indication packet, and outputs the preliminary indication packet. The output port 309 stores the preliminary indication packet in the output queue 3093a used for high-priority packets. The control packet processing unit 305 outputs the reception time TSin of the preliminary indication packet to the output control unit 3091.

In this case, as in the first modification, the output control unit 3091 of the control target output port CP determines whether or not a setting has been made to change the control time in the preliminary indication packet (step S181). If a setting has not been made to change the control time in the preliminary indication packet, the process returns to the main process. If a setting has been made to change the control time in the preliminary indication packet, the output control unit 3091 calculates the predicted transmission time TSout of the preliminary indication packet when determining the output schedule of the preliminary indication packet. The output control unit 3091 further calculates a new control time by subtracting the difference time, TSout−TSin, from the control time included in the preliminary indication packet, and sets the calculated control time in the preliminary indication packet (step S183). After that, the preliminary indication packet in which the control time has been updated is transmitted to the subsequent switch or any other suitable device.

Therefore, the first modification can also be accomplished.

In a second modification, it is also possible to reduce a time period during which the output of low-priority packets is stopped. As described in the first modification described above, a real-time packet is transmitted when a time equal to the control time included in the preliminary indication packet received from the preceding switch has elapsed since the preliminary indication packet was received. The real-time packet passes though the individual switches located along the path for a time period up to the transmission delay time after the transmission time of the real-time packet. Therefore, even if an error is taken into account, it would be sufficient to stop the output of low-priority packets for a time equal to the transmission delay time before and after the transmission time of the real-time packet.

Figure 37:
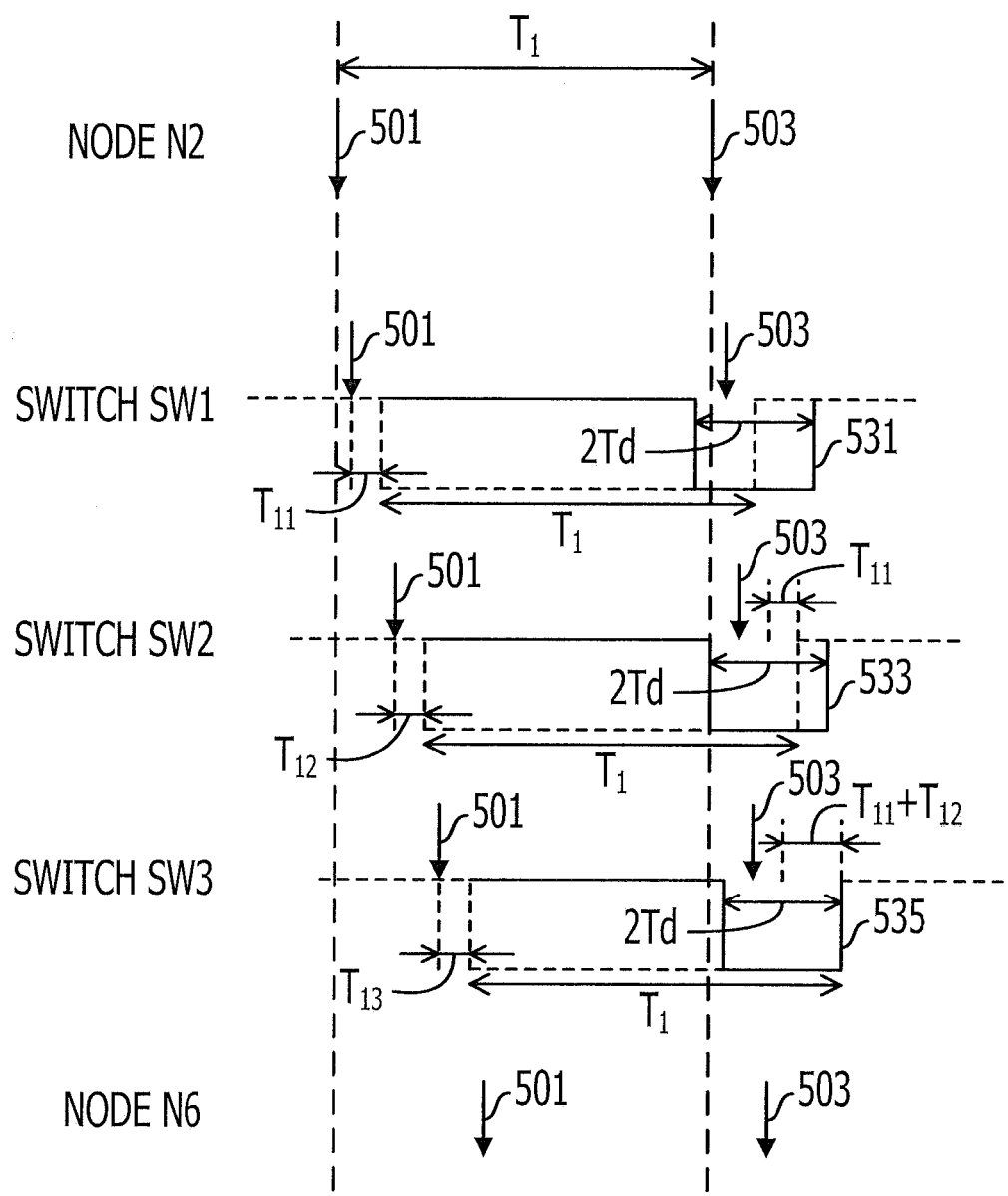
FIG. 37 is a diagram illustrating a transmission timing of a preliminary indication packet and a real-time packet in case of forward transmission according to a second modification.

The timings in the process in case of forward transmission will be described with reference to, for example, FIG. 37. In FIG. 37, a preliminary indication packet and a real-time packet are transmitted from the node N2 illustrated at the top to the switch SW1, the switch SW2, the switch SW3, and the node N6 in this order, and time passes from left to right. An arrow 501 represents a preliminary indication packet, and an arrow 503 represents a real-time packet. The direction of the arrows 501 and 503 is identical to the transmission direction of the corresponding packets, and indicates forward transmission in which the preliminary indication packet and the real-time packet are transmitted from the node N2 to the node N6. As described above, the node N2 outputs the preliminary indication packet 501 a time equal to a forward predicted delay time $T_1$ before the real-time packet 503 is transmitted. The preliminary indication packet 501 may collide with other packets, and a certain amount of delay occurs in each of the switches SW1 to SW3. The above description is substantially the same as that of FIG. 34.

After the switch SW1 receives the preliminary indication packet 501 and sends an instruction to one of the output ports 309, the switch SW1 waits for a time given by (forward predicted delay time $T_1$−transmission delay time Td from the node N2 to the node N6). When the time given by $T_1$−Td has elapsed, as indicated by a signal 531 (low active), the output of low-priority packets is stopped for a period of 2Td.

Also in the second modification, the switch SW1 calculates a new control time by subtracting the difference time $T_{11}$ given by (predicted transmission time TSout of the preliminary indication packet 501−reception time TSin) from the control time (=forward predicted delay time) included in the received preliminary indication packet 501, and transmits to the switch SW2 the preliminary indication packet 501 in which the calculated control time has been set.

After the switch SW2 receives the preliminary indication packet 501 and sends an instruction to one of the output ports 309, the switch SW2 waits for a time given by ((forward predicted delay time given by $T_1$−$T_{11}$) included in the received preliminary indication packet−transmission delay time Td from the node N2 to the node N6). When the time given by $T_1$−$T_{11}$−Td has elapsed, as indicated by a signal 533 (low active), the output of low-priority packets is stopped for a period of 2Td.

In the second modification, furthermore, the switch SW2 calculates a new control time by subtracting the difference time $T_{12}$ given by (predicted transmission time TSout of the preliminary indication packet 501−reception time TSin) from the control time included in the received preliminary indication packet 501, and transmits to the switch SW3 the preliminary indication packet 501 in which the calculated control time has been set.

After the switch SW3 receives the preliminary indication packet 501 and sends an instruction to one of the output ports 309, the switch SW3 waits for a time given by ((forward predicted delay time given by $T_1$−$T_{11}$−$T_{12}$) included in the received preliminary indication packet−transmission delay time Td from the node N2 to the node N6). When the time given by $T_1$−$T_{11}$−$T_{12}$−Td has elapsed, as indicated by a signal 535 (low active), the output of low-priority packets is stopped for a period of 2Td.

In the second modification, furthermore, the switch SW3 calculates a new control time by subtracting the difference time $T_{13}$ given by (predicted transmission time TSout of the preliminary indication packet 501−reception time TSin) from the control time included in the received preliminary indication packet 501, and transmits to the node N6 the preliminary indication packet 501 in which the calculated control time has been set.

Thus, the real-time packet 503 reaches each of the switches SW1 to SW3 within a time period during which the level of a signal indicating a time period during which the output of low-priority packets is stopped is low, and collisions with non-real-time packets are avoided.

Figure 38:
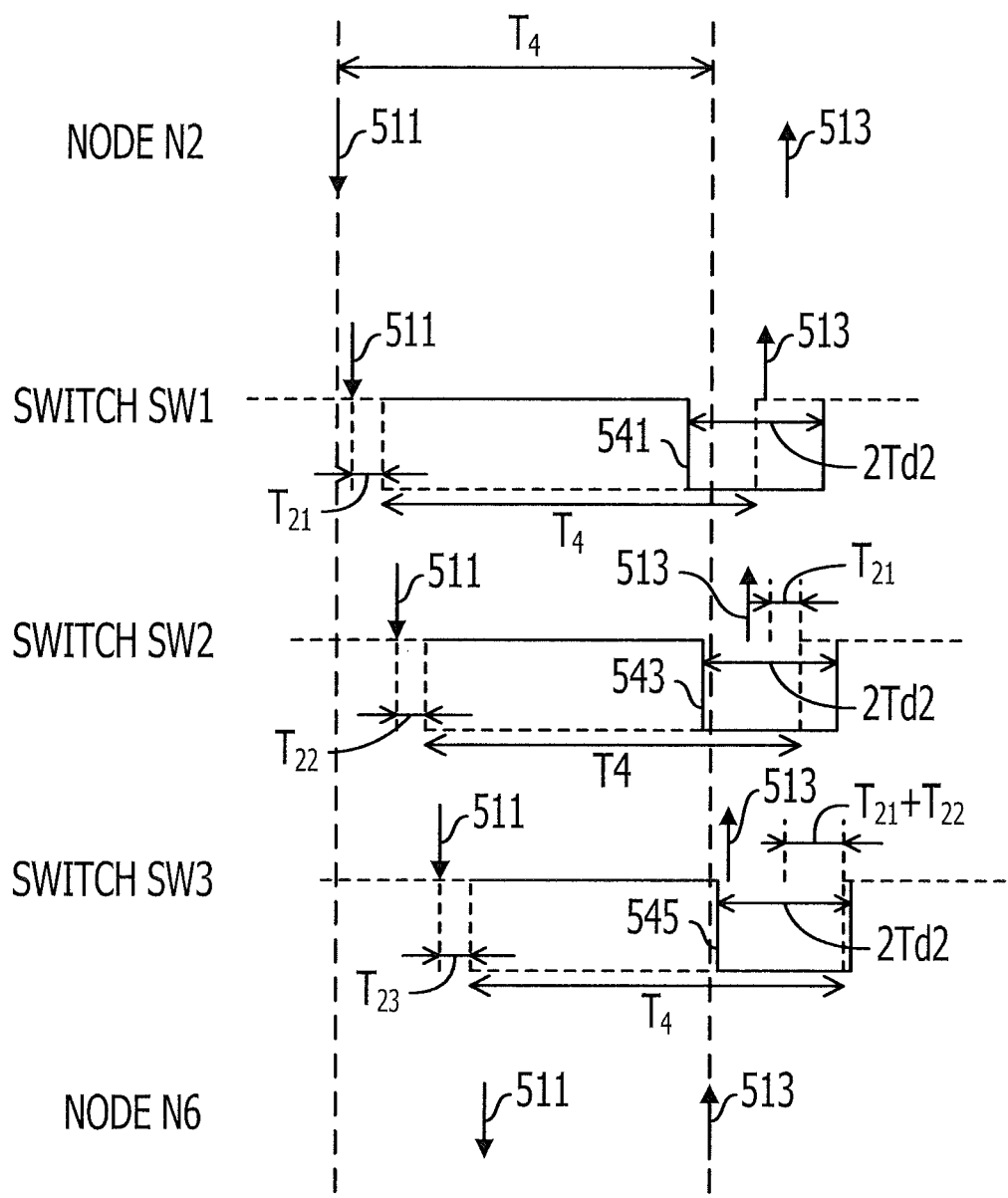
FIG. 38 is a diagram illustrating a transmission timing of a preliminary indication packet and a real-time packet in case of backward transmission according to the second modification.

Next, the timings in the process in case of backward transmission according to the second modification will be described with reference to FIG. 38. In FIG. 38, a preliminary indication packet is transmitted from the node N2 illustrated at the top to the switch SW1, the switch SW2, the switch SW3, and the node N6 in this order, and time passes from left to right. An arrow 511 represents a preliminary indication packet, and an arrow 513 represents a real-time packet. The direction of the arrows 511 and 513 is identical to the transmission direction of the corresponding packets. The preliminary indication packet 511 is transmitted from the node N2 to the node N6, and the real-time packet 513 is transmitted from the node N6 to the node N2, thereby indicating that backward transmission is to occur. As described above, the node N2 outputs the preliminary indication packet 511 a time equal to a backward predicted delay time $T_4$ before the real-time packet 513 is transmitted. The preliminary indication packet 511 may collide with other packets, and a certain amount of delay occurs in each of the switches SW1 to SW3. The above description is substantially the same as that of FIG. 35.

After the switch SW1 receives the preliminary indication packet 501 and sends an instruction to one of the output ports 309, the switch SW1 waits for a time given by (backward predicted delay time $T_4$–transmission delay time Td2 from the node N6 to the node N2). When the time given by $T_4$–Td2 has elapsed, as indicated by a signal 541 (low active), the output of low-priority packets is stopped for a period of 2Td2.

Also in the second modification, the switch SW1 calculates a new control time by subtracting the difference time $T_{21}$ given by (predicted transmission time TSout of the preliminary indication packet 511–reception time TSin) from the control time (=backward predicted delay time) included in the received preliminary indication packet 511, and transmits to the switch SW2 the preliminary indication packet 511 in which the calculated control time has been set.

After the switch SW2 receives the preliminary indication packet 511 and sends an instruction to one of the output ports 309, the switch SW2 waits for a time given by ((backward predicted delay time given by $T_4$–$T_{21}$) included in the received preliminary indication packet–transmission delay time Td2 from the node N6 to the node N2). When the time given by $T_4$–$T_{21}$–Td2 has elapsed, as indicated by a signal 543 (low active), the output of low-priority packets is stopped for a period of 2Td2.

In the second modification, furthermore, the switch SW2 calculates a new control time by subtracting the difference time $T_{22}$ given by (predicted transmission time TSout of the preliminary indication packet 511–reception time TSin) from the control time included in the received preliminary indication packet 511, and transmits to the switch SW3 the preliminary indication packet 511 in which the calculated control time has been set.

After the switch SW3 receives the preliminary indication packet 511 and sends an instruction to one of the output ports 309, the switch SW3 waits for a time given by ((backward predicted delay time given by $T_4$–$T_{21}$–$T_{22}$) included in the received preliminary indication packet–transmission delay time Td2 from the node N6 to the node N2). When the time $T_4$–$T_{21}$–$T_{22}$–Td2 has elapsed, as indicated by a signal 545 (low active), the output of low-priority packets is stopped for a period of 2Td2.

Thus, the real-time packet 513 reaches each of the switches SW1 to SW3 within a time period during which the level of a signal indicating a time period during which the output of low-priority packets is stopped is low, and collisions with non-real-time packets are avoided.

Figure 39:
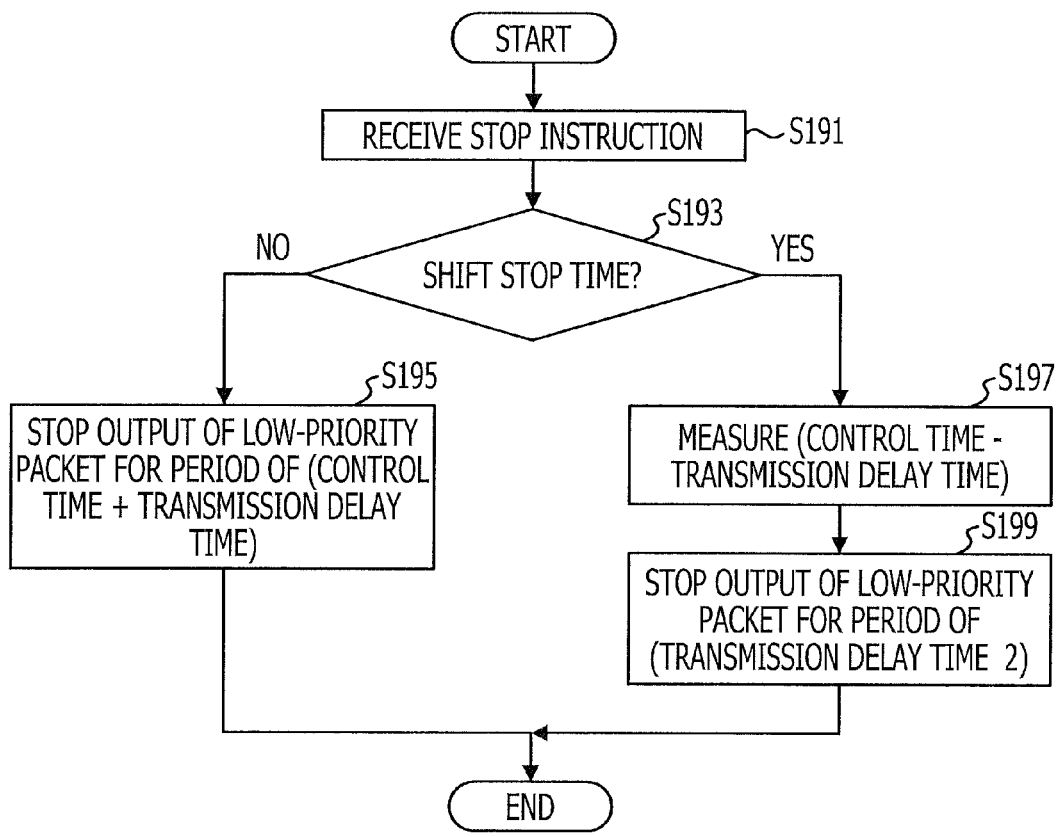
FIG. 39 is a diagram illustrating a process flow of an output control unit.

FIG. 39 illustrates a summarized process performed by the output control unit 3091 of each of the output ports 309 to implement the above two modifications and the basic method. Upon receiving a stop instruction from the control packet processing unit 305 (step S191), the output control unit 3091 determines whether or not a setting has been made to shift the time during which the output of low-priority packets is stopped (hereinafter referred to as the "stop time") (step S193). Specifically, it is determined whether or not the second modification is to be implemented. The stop time is not shifted in the basic method or the first modification. If the stop time is not to be shifted, the output control unit 3091 stops the output of packets from the output queue 3093b used for low-priority packets, for a period given by (control time+transmission delay time) included in the stop instruction (step S195). Then, the output control unit 3091 waits for the next stop instruction.

If the stop time is to be shifted, the output control unit 3091 measures the value given by (control time–transmission delay time) using the control time included in the stop instruction and using the transmission delay time (step S197). For example, the measured value is set in a timer and the timer is caused to count down. When the value of the timer becomes 0, the output control unit 3091 stops the output of packets from the output queue 3093b used for low-priority packets, for a time period that is twice the transmission delay time (step S199). Then, the output control unit 3091 waits for the next stop instruction.

The output control unit 3091 may perform part of the preliminary indication packet process (FIG. 36: S183) in addition to the process described above.

Therefore, the two modifications, as well as the basic method, can also be accomplished.

In the implementation of the basic method and the first modification, furthermore, instead of each of the switches SW1 to SW3 adding the transmission delay time, the source node N2 of the preliminary indication packet may in advance add the transmission delay time to the forward predicted delay time or the backward predicted delay time and then set the result as the value of the control time Pause in the preliminary indication packet.

In addition, for example, the first data storage unit 110 of the node N2 holds the data illustrated in FIG. 6. That is, a transmission delay time is stored for each combination of source and destination nodes. As described above, one maximum value among measurement results for each combination of source and destination nodes may be set so that a common value is used for the combination of source and destination nodes. Furthermore, a maximum value may be initially set. For forward transmission, the communication control unit 100 of the source node may record a transmission time when a real-time packet is transmitted. Further, the communication control unit 100 may be separately notified of a reception time of the real-time packet using a control packet or any other suitable method from the destination node, calculate the difference between the reception time and the transmission time, and store the difference in the first data storage unit 110 as a subsequent transmission delay time. For backward transmission, for example, a real-time packet may include a transmission time, and the difference between the reception time of the preliminary indication packet at the source node and the transmission time included in the real-time packet may be calculated and stored in the first data storage unit 110.

Figure 24:
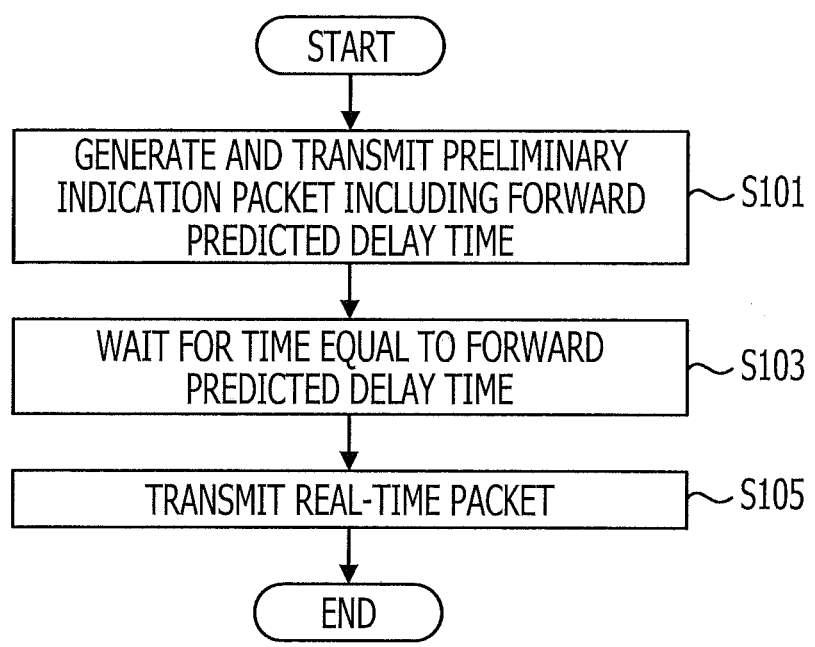
FIG. 24 is a diagram illustrating a process flow of a node that transmits a real-time packet in case of forward transmission.
Figure 40A:
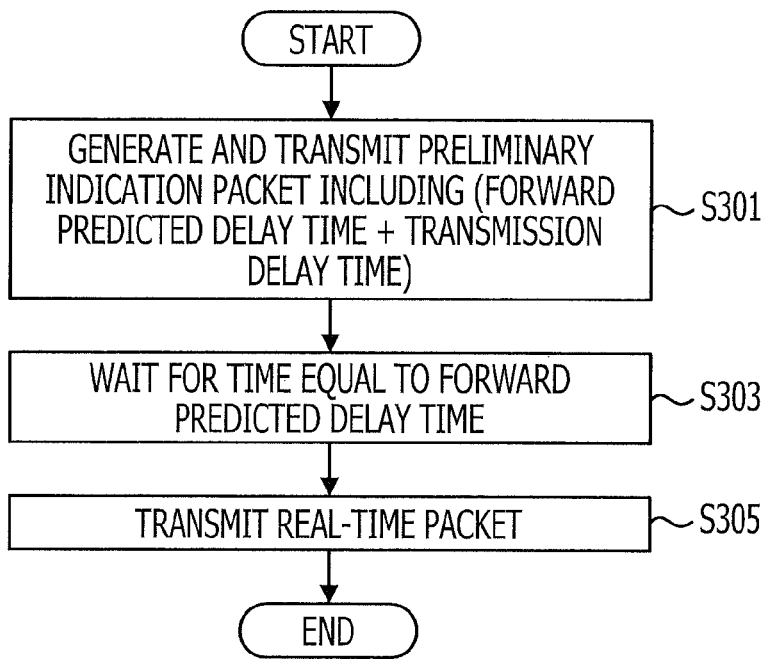
FIG. 40A is a diagram illustrating a process flow (further modification) of a source node for forward transmission.

Based on the above assumption, specifically, a process illustrated in FIG. 40A is performed in place of the process illustrated in FIG. 24. When forward transmission is to be performed, a preliminary indication packet is transmitted a time equal to a forward predicted delay time before the timing at which a real-time packet is transmitted. That is, the communication control unit 100 of the node N2 generates a preliminary indication packet including the value given by (forward predicted delay time+transmission delay time from the node N2 to the node N6) a time equal to a forward predicted delay time before the timing at which a real-time packet is transmitted, and transmits the preliminary indication packet to the node N6 (step S301). Specifically, the preliminary indication packet is forwarded to the switch SW1. In the packet format of the preliminary indication packet illustrated in FIG. 25, the value of the control time Pause is given by (forward predicted delay time+transmission delay time from the node N2 to the node N6). However, as described above, in the first modification, the value of the control time Pause may be changed along the path.

Then, the communication control unit 100 of the node N2 waits for a time equal to the forward predicted delay time (step S303). When the time equal to the forward predicted delay time has elapsed, the communication control unit 100 generates a real-time packet from, for example, the data generated by the controller 130 and stored in the second data storage unit 120, and transmits the real-time packet to the node N6 (step S305). Specifically, the real-time packet is forwarded to the switch SW1.

Figure 40B:
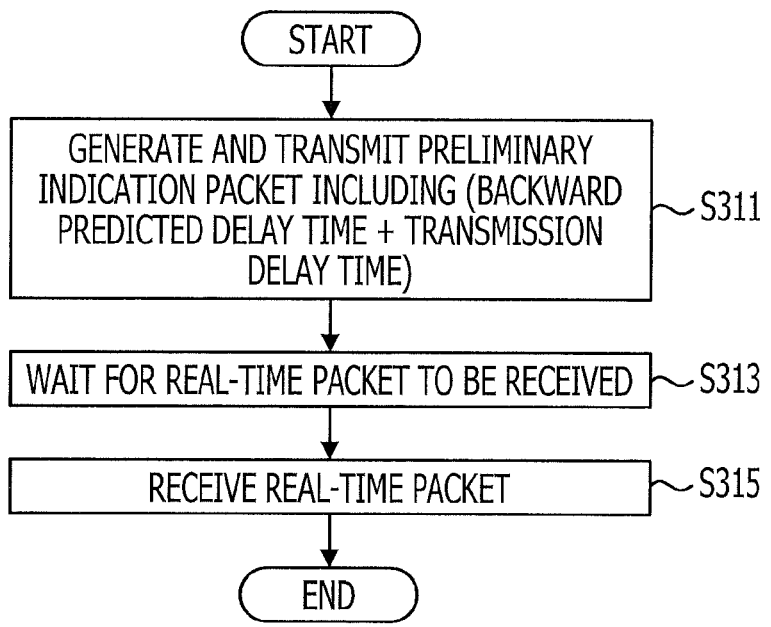
FIG. 40B is a diagram illustrating a process flow (further modification) of a source node for backward transmission.

Additionally, a process illustrated in FIG. 40B is performed in place of the process illustrated in FIG. 30. First, the communication control unit 100 of the node N2 generates a preliminary indication packet including, for example, the value given by (backward predicted delay time+transmission delay time from the node N6) to the node N2 a time equal to a backward predicted delay time before the timing at which the node N6 transmits a real-time packet, and transmits the preliminary indication packet to the node N6 (step S311). In the packet format of the preliminary indication packet illustrated in FIG. 31, the value of the control time Pause is given by (backward predicted delay time+transmission delay time from the node N6 to the node N2). As described above, in the first modification, the value of the control time Pause may be changed along the path.

Then, the communication control unit 100 of the node N2 waits for a real-time packet to be received (step S313). After that, the communication control unit 100 of the node N2 receives a real-time packet from the switch SW1, and stores the data of the real-time packet in the second data storage unit 120 (step S315). The controller 130 of the node N2 retrieves the received data of the real-time packet from the second data storage unit 120, and processes the retrieved data.

Figure 40C:
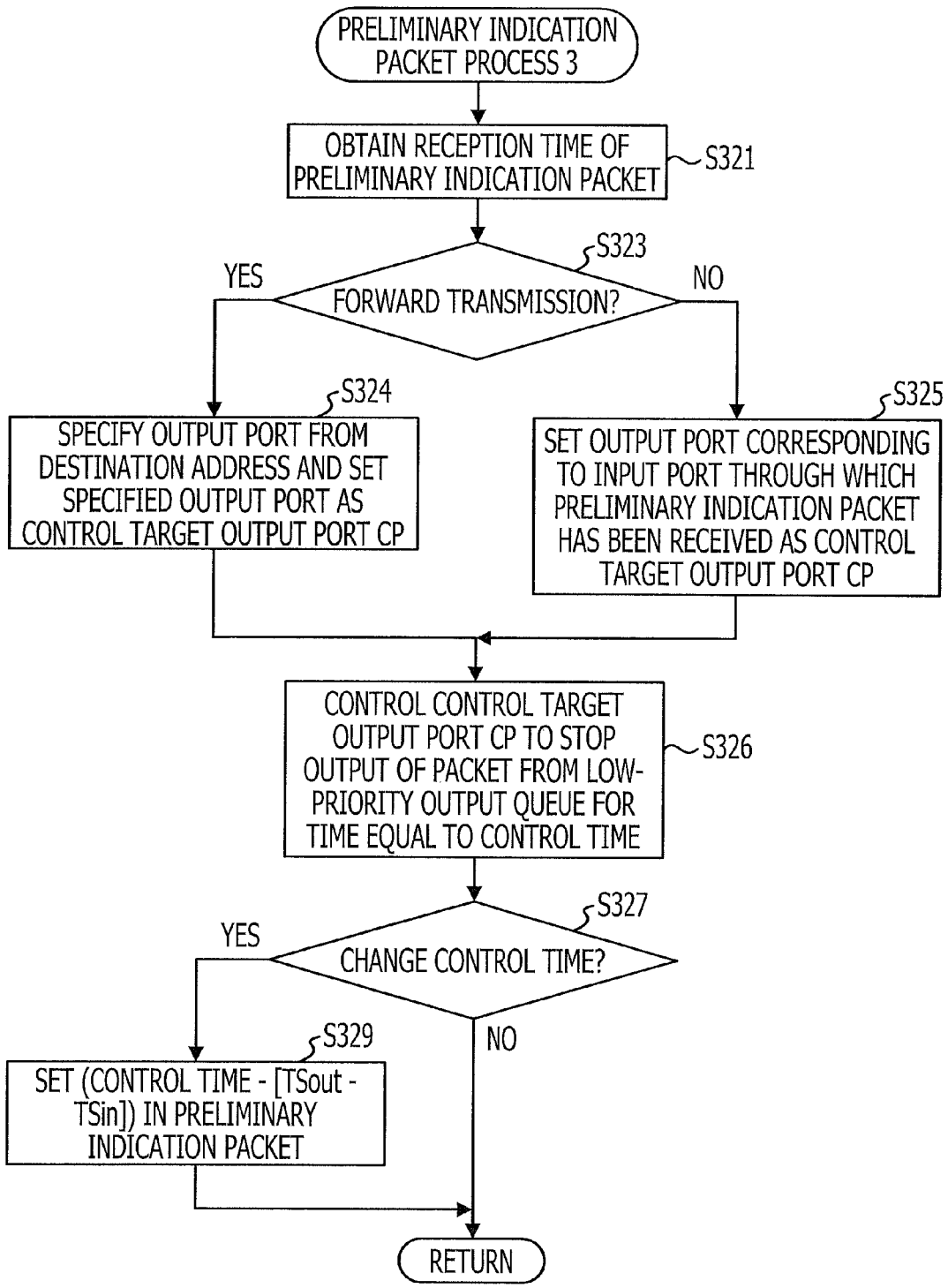
FIG. 40C is a diagram illustrating a further modification of a preliminary indication packet process.

Additionally, a preliminary indication packet process illustrated in FIG. 40C is performed in place of the preliminary indication packet processes illustrated in FIGS. 27 and 36.

First, for example, if the received packet is a preliminary indication packet, the detection unit 303 obtains the reception time TSin, and outputs the data of the reception time TSin and the preliminary indication packet to the control packet processing unit 305 (step S321).

The control packet processing unit 305 determines from the Fdir flag of the preliminary indication packet whether or not forward transmission is to occur (step S323). If forward transmission is to occur, the control packet processing unit 305 specifies a corresponding one of the output ports 309 from the destination address (or, for example, identification information about the destination node) of the preliminary indication packet, and sets the specified output port 309 as a control target output port CP (step S324). Then, the process proceeds to step S326. If backward transmission is to occur, the control packet processing unit 305 sets, as a control target output port CP, one of the output ports 309 corresponding to one of the input ports 301 through which the preliminary indication packet has been received (or one of the output ports 309 that is specified from the source address (or from, for example, identification information about the source node)) (step S325). Then, the process proceeds to step S326.

In step S326, the control packet processing unit 305 controls the control target output port CP to stop the output of packets from the output queue 3093b used for low-priority packets only during the control time period (step S326). In this manner, since each of the switches SW1 to SW3 does not add the transmission delay time, the output of packets is stopped only during a period equal to the control time.

After that, the control packet processing unit 305 outputs the preliminary indication packet to the switching unit 307. The switching unit 307 specifies a corresponding one of the output ports 309 in accordance with the destination node of the preliminary indication packet, and outputs the preliminary indication packet. The output port 309 stores the preliminary indication packet in the output queue 3093a used for high-priority packets. The control packet processing unit 305 outputs the reception time TSin of the preliminary indication packet to the output control unit 3091.

In this case, as in the first modification, the output control unit 3091 of the control target output port CP determines whether or not a setting has been made to change the control time in the preliminary indication packet (step S327). If a setting has not been made to change the control time in the preliminary indication packet, the process returns to the main process. If a setting has been made to change the control time in the preliminary indication packet, the output control unit 3091 calculates the predicted transmission time TSout of the preliminary indication packet when determining the output schedule of the preliminary indication packet. The output control unit 3091 further calculates a new control time by subtracting the difference time, TSout−TSin, from the control time included in the preliminary indication packet, and sets the calculated control time in the preliminary indication packet (step S329). After that, the preliminary indication packet in which the control time has been updated is transmitted to the subsequent switch or any other suitable device.

Also in the second modification, a further modification may be made in this manner. The output of packets from the output queue 3093b used for low-priority packets is not stopped for a period from the time given by (control time−transmission delay time) to the time given by (control time+transmission delay time), but the output of packets from the output queue 3093b used for low-priority packets is stopped for a period from the time given by (control time−2×transmission delay time) to the control time.

In the example described above, it is assumed that both forward transmission and backward transmission are performed. However, in an embodiment, backward transmission may not necessarily be performed. That is, when the sensor 230 performs measurement, the node N6 including the sensor 230 may transmit a preliminary indication packet to the node N2 including the controller 130, and further transmit a real-time packet.

Figure 41:
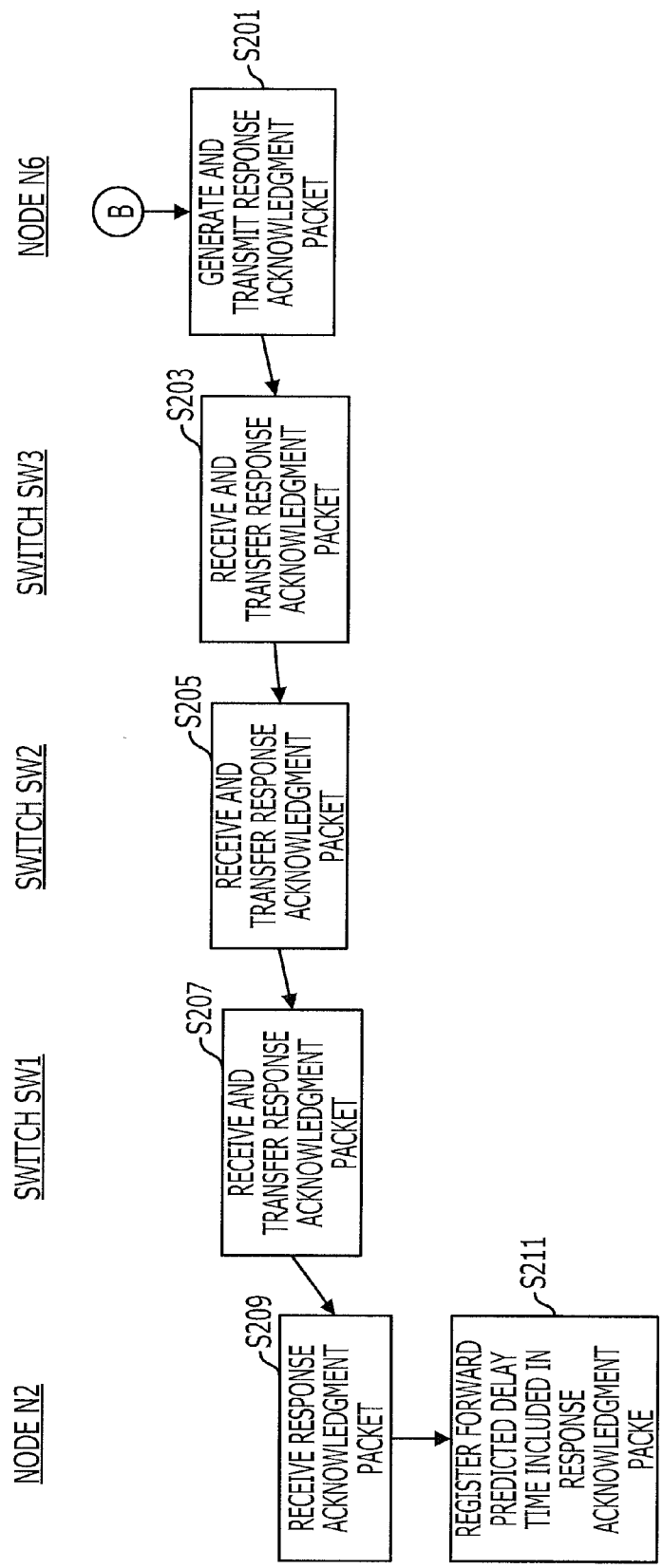
FIG. 41 is a diagram illustrating a process flow when a response acknowledgment packet is transmitted in a case where only forward transmission is performed.

In this case, a process illustrated in FIG. 41 is performed in place of the process (FIG. 15) that follows connector B in FIG. 12. Here, a request packet is transmitted from the node N2 to the node N6. Similar processing may also be performed when a request packet is to be transmitted from the node N6 to the node N2.

Figure 42:
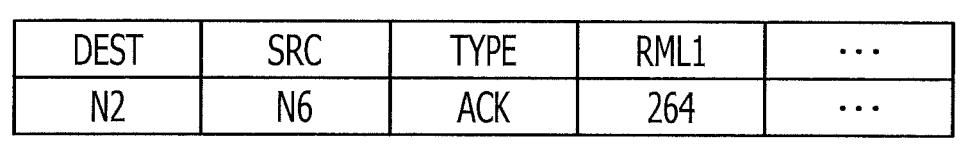

The communication control unit 200 of the node N6 generates a response acknowledgment packet including the forward predicted delay time Rml1, and transmits the response acknowledgment packet to the node N2 (step S201). Specifically, the response acknowledgment packet is output to the switch SW3. For example, a response acknowledgment packet illustrated in FIG. 42 is output. In the example illustrated in FIG. 42, the response acknowledgment packet contains the destination node ("Dest") N2, the source node ("Src") N6, the type of control packet ("Type"), which is set to "Ack" representing a response acknowledgment packet, and the forward predicted delay time Rml1 with respect to the source node N2. Unlike the format illustrated in FIG. 22, the backward predicted delay time Rml2 is not contained. If forward transmission is not to be performed, no response packet is used.

When one of the input ports 301 of the switch SW3 receives the response acknowledgment packet, the input port 301 outputs the response acknowledgment packet to the associated detection unit 303. Upon detecting the receipt of the response acknowledgment packet, the detection unit 303 outputs the response acknowledgment packet to the control packet processing unit 305. If it is determined that the received packet is a response acknowledgment packet, the control packet processing unit 305 outputs the response acknowledgment packet to the switching unit 307 as it is because no processes are to be performed on the response acknowledgment packet. The switching unit 307 outputs the response acknowledgment packet to a corresponding one of the output ports 309. The output port 309 stores the response acknowledgment packet in a desired one of the output queues 3093 as a packet having a normal priority. After that, the output control unit 3091 outputs an instruction to the output queue 3093 in a normal manner to output the response acknowledgment packet (step S203). Here, the switch SW2 is a switch to which the response acknowledgment packet is to be output.

Upon receiving the response acknowledgment packet, the switch SW2 performs a process similar to that of the switch SW3, and transmits the response acknowledgment packet to the switch SW1 (step S205). Upon receiving the response acknowledgment packet, the switch SW1 performs a process similar to that of the switch SW3, and transmits the response acknowledgment packet to the designation, that is, the node N2 (step S207). Upon receiving the response acknowledgment packet (step S209), the communication control unit 100 of the node N2 stores the value of the forward predicted delay time Rml1 included in the response acknowledgment packet in the first data storage unit 110 as a forward predicted delay time in association with the destination node N6 (step S211).

By performing the above process, it is possible to obtain a forward predicted delay time used for the transmission of a preliminary indication packet even if only forward transmission is to be performed.

Figure 43:
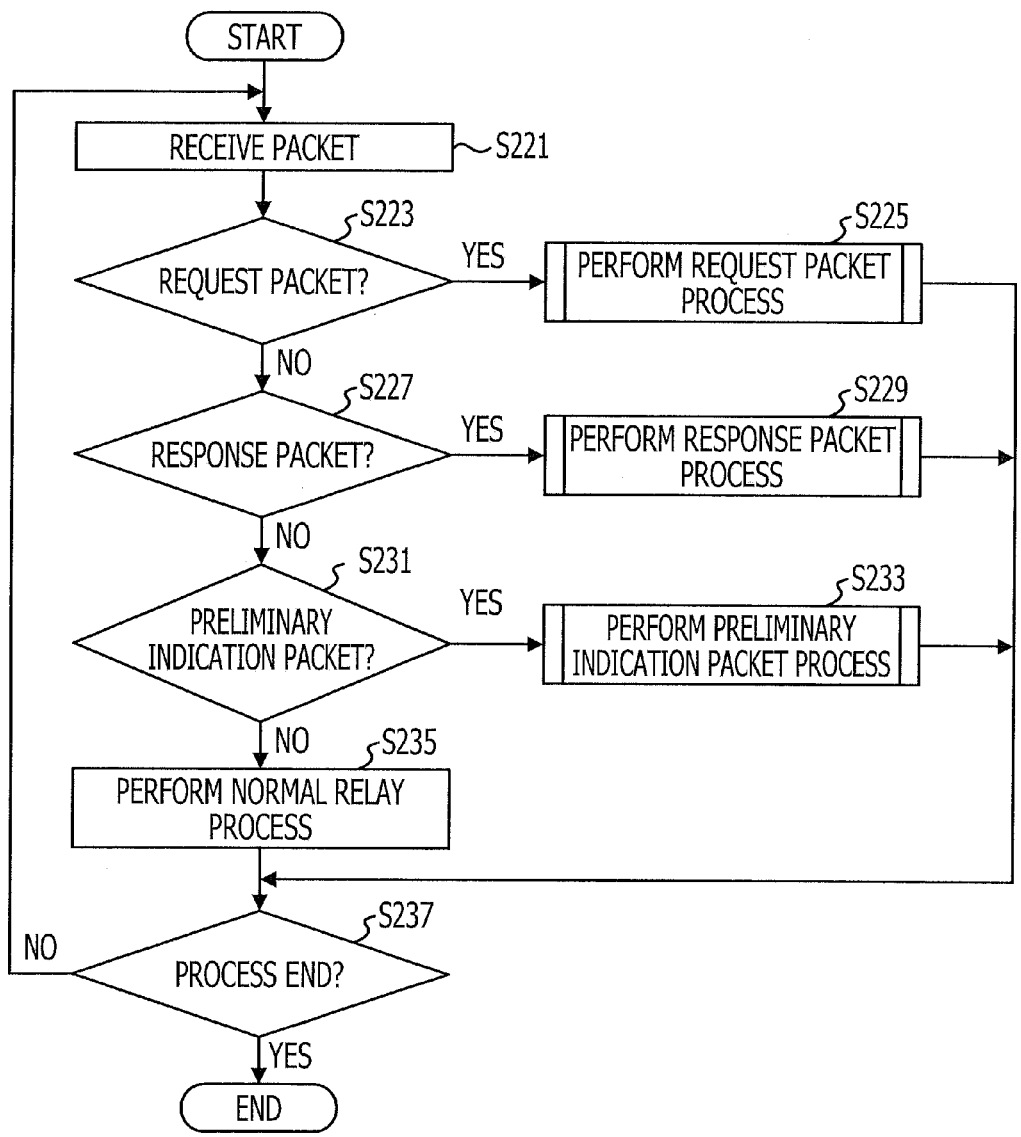
FIG. 43 is a diagram illustrating a flow of the integration of the processes of a switch.

In the foregoing description, the processes performed by each of the switches SW1 to SW3 are sorted by situation in advance prior to the description. FIG. 43 illustrates the integration of the processes performed by each of the switches SW1 to SW3 (referred to as the "switch SW"). When one of the input ports 301 of the switch SW receives a packet (step S221), the associated detection unit 303 determines whether or not the received packet is a control packet. If the received packet is a control packet, the control packet is output to the control packet processing unit 305. However, a response acknowledgment packet, which is a control packet, may be regarded as a normal packet because no special processes are to be performed.

The control packet processing unit 305 determines whether or not the received packet is a request packet (step S223). If the received packet is a request packet (step S223: Yes route), the control packet processing unit 305 performs the request packet process described above (FIG. 10) (step S225). Then, the process proceeds to step S237. If the received packet is not a request packet (step S223: No route), the control packet processing unit 305 determines whether or not the received packet is a response packet (step S227). If the received packet is a response packet (step S227: Yes route), the control packet processing unit 305 performs a response packet process (FIG. 17) (step S229). Then, the process proceeds to step S237. If the received packet is not a response packet (step S227: No route), the control packet processing unit 305 determines whether or not the received packet is a preliminary indication packet (step S231). If the received packet is a preliminary indication packet (step S231: Yes route), the control packet processing unit 305 performs a preliminary indication packet process (FIG. 27/FIG. 36/FIG. 40C) (step S233). Then, the process proceeds to step S237. If the received packet is not a preliminary indication packet (step S231: No route), the received packet is a response acknowledgment packet or a normal packet. Thus, the switch SW performs a normal relay process (step S235).

The above process is repeatedly performed until the process ends, for example, until the power is turned off (step S237).

The above process allows a real-time packet to be transmitted to the target node with a low delay while avoiding a collision with a non-real-time packet.

Figure 44:
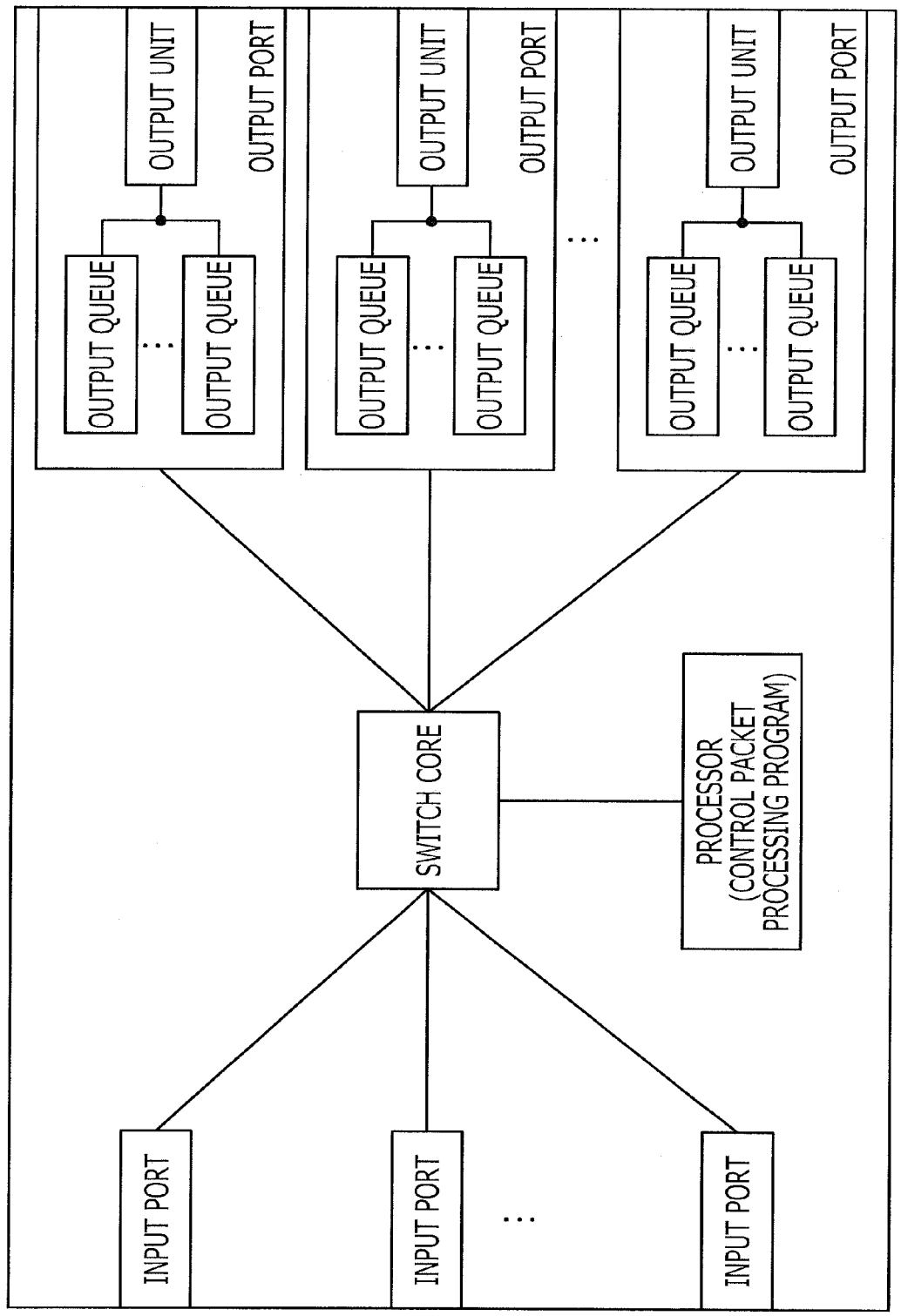
FIG. 44 is a diagram illustrating another example configuration of a switch.

While embodiments of the present technology have been described, the present technology is not limited thereto. For example, the functional block diagrams in FIGS. 2 to 4 and 7 are examples, and may not necessarily match the actual component configurations. In particular, the control packet processing unit 305 may be implemented as a dedicated semiconductor device or may be implemented by, as illustrated in FIG. 44, allowing a separate processor coupled to a switch core to execute a program for performing the above processes. Likewise, the functional block diagrams of the nodes N2 and N6 illustrated in FIGS. 2 and 3, respectively, may not necessarily match the actual program module configurations. Furthermore, each of the detection units 303 may be implemented as a dedicated circuit, or may be implemented by using a filter like an existing access control list (ACL).

Figure 45:
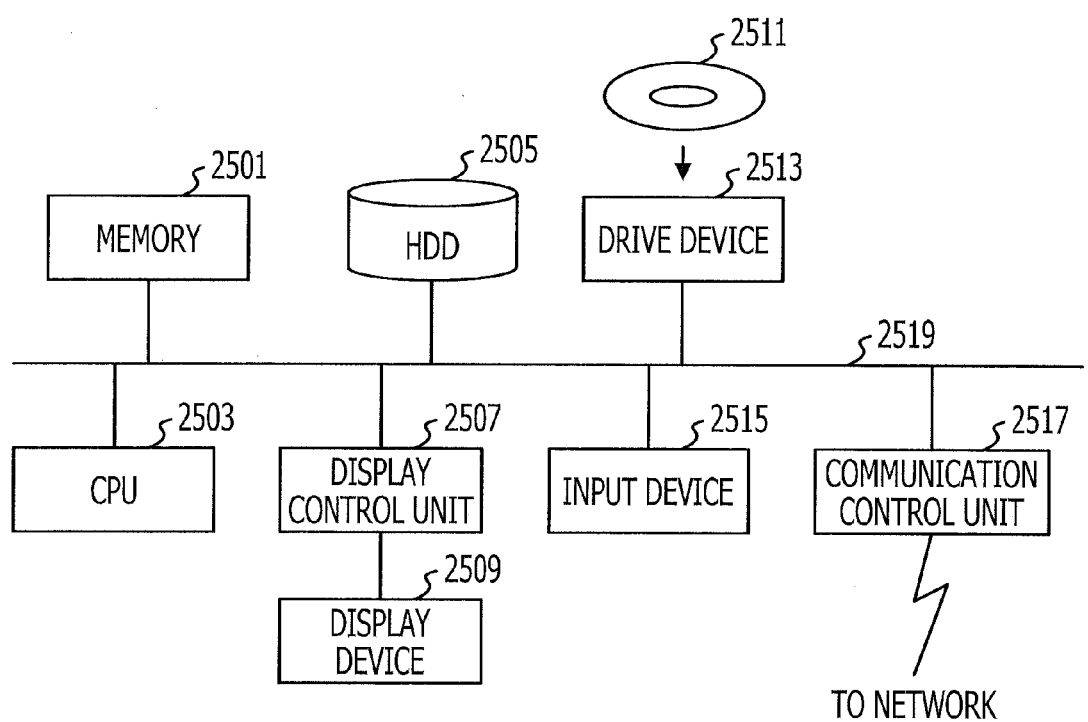
FIG. 45 is a functional block diagram of a node.

Each of the nodes coupled to the switches SW1 to SW6, including the nodes N1 to N6, may be a computer device, in which, as illustrated in FIG. 45, a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 to be coupled to a network are coupled to one another via a bus 2519. An operating system (OS) and an application program for performing processing according to an embodiment are stored in the HDD 2505, and are read into the memory 2501 from the HDD 2505 when executed by the CPU 2503. The CPU 2503 controls the display control unit 2507, the communication control unit 2517, and the drive device 2513 in accordance with the content of the processing of the application program to perform certain operations. The data being processed is generally stored in the memory 2501 but may be stored in the HDD 2505. In an embodiment of the present technology, an application program for performing the processes described above is stored in and distributed through the removable disk 2511, which is computer-readable, and is installed into the HDD 2505 from the drive device 2513. The application program may also be installed into the HDD 2505 through the communication control unit 2517 over a network such as the Internet. This computer device implements the various functions described above by organic cooperation between hardware such as the CPU 2503 and the memory 2501 and programs such as the OS and the application program.

The features of the embodiment described above may be summarized as follows.

A communication control method according to a first aspect is a communication control method for controlling communication between a first node and a second node via one or more relay devices. The communication control method includes (A) a first transmitting step of transmitting a control packet from the first node to the second node before transmitting a first packet having a higher priority than another packet to be relayed by the one or more relay devices, (B) a step of stopping, for a relay device among the one or more relay devices which is located along a path from the first node to the second node, a packet from being output from a packet storage unit used for the other packet, in accordance with the control packet, for a period specified from a control time included in the control packet, the packet storage unit being included in one of a plurality of output ports of the relay device from which the first packet is to be output, and (C) a second transmitting step of transmitting the first packet from the first node to the second node or from the second node to the first node during the specified period.

Therefore, no collisions with low-priority packets occur in the relay device, and the first packet can be transmitted with low delay.

The communication control method may further include (D) a step of transmitting a second control packet from the first node to the second node, the second control packet being configured to collect a predicted delay time from the first node to the second node, and (E) a step of setting in the second control packet a sum of a first predicted delay time included in the second control packet and a predicted delay time that will be incurred in the relay device located along the path from the first node to the second node, as a new first predicted delay time, in accordance with the second control packet, the predicted delay time being held in the relay device in association with one of the plurality of output ports that is specified from the address of the second node, before transmitting the second control packet. Therefore, control times can be automatically collected.

The communication control method may further include (F) a step of transmitting a third control packet from the second node to the first node, the third control packet being configured to notify the first node of the first predicted delay time and to collect a second predicted delay time from the second node to the first node, and (G) a step of setting in the third control packet a sum of the second predicted delay time included in the third control packet and a predicted delay time that will be incurred in the relay device located along the path from the second node to the first node, as a new second predicted delay time, in accordance with the third control packet, the predicted delay time being held in the relay device in association with one of the plurality of output ports that is specified from the address of the first node. Therefore, a real-time packet can be bi-directionally exchanged with a low delay.

The communication control method may further include (H) a step of transmitting a fourth control packet from the first node to the second node, the fourth control packet configured to notify the second node of the second predicted delay time.

The specified period may be one of (a) a period from when the control packet is received to when a time equal to the control time has elapsed, (b) a period from when the control packet is received to when a time that is a sum of the control time and a time corresponding to a transmission delay time from a transmission source of the first packet to a transmission destination of the first packet has elapsed, the first packet being transmitted after the control packet, (c) a period from when a time obtained by subtracting a time corresponding to the transmission delay time from the control time has elapsed since the control packet was received to when a time that is twice the time corresponding to the transmission delay time has elapsed, and (d) a period from when a time obtained by subtracting a time that is twice the time corresponding to the transmission delay time from the control time has elapsed since the control packet was received to when the time that is twice the time corresponding to the transmission delay time has elapsed. The periods (a) and (b) can provide a simple mechanism, and the periods (c) and (d) can provide an increase in network communication efficiency. The control time may or may not include a transmission delay time.

The communication control method may further include (I) a step of setting in the control packet, as a new control time, a time obtained by subtracting from the control time included in the control packet a difference between a scheduled transmission time of the control packet at the relay device located along the path from the first node to the second node and a reception time of the control packet, before transmitting the control packet. Therefore, network communication efficiency can be increased.

The first transmitting step may be performed a time, which is equal to a control time included in the control packet transmitted from the first node, before the second transmitting step. The reason for this is to ensure that a collision between a real-time packet and a low-priority packet is avoided.

A relay device according to a second aspect includes (A) a plurality of output ports each including a first packet storage unit that stores a first packet having a first priority, and a second packet storage unit that stores a second packet having a second priority lower than the first priority, (B) a detection unit that detects a receipt of a control packet at each of a plurality of input ports of the relay device, the control packet being transmitted before the first packet is transmitted and including a control time used to perform control to stop a packet from being output from the second packet storage unit in one of the plurality of output ports, and (C) a processing unit that, when the detection unit detects a control packet, controls one of the plurality of output ports to stop a packet from being output from the second packet storage unit for a period which is specified from a control time included in the control packet and during which the first packet will reach, the one of the plurality of output ports being an output port which is specified from the control packet and which outputs the first packet.

Therefore, a first packet having a high priority can be transmitted with a low delay without colliding with a second packet having a low priority.

The specified period may be set, based on the control time, to include a time at which the first packet transmitted after the control packet reaches the relay device. The period can be adjusted in various ways.

Also in the second aspect, the period is one of (a) a period from when the control packet is received to when a time equal to the control time has elapsed, (b) a period from when the control packet is received to when a time that is a sum of the control time and a time corresponding to a transmission delay time from a transmission source of the first packet to a transmission destination of the first packet has elapsed, the first packet being transmitted after the control packet, (c) a period from when a time obtained by subtracting a time corresponding to the transmission delay time from the control time has elapsed since the control packet was received to when a time that is twice the time corresponding to the transmission delay time has elapsed, and (d) a period from when a time obtained by subtracting a time that is twice the time corresponding to the transmission delay time from the control time has elapsed since the control packet was received to when the time that is twice the time corresponding to the transmission delay time has elapsed. The periods (a) and (b) can provide a simple mechanism, and the periods (c) and (d) can provide an increase in network communication efficiency. The control time may or may not include a transmission delay time.

Each of the plurality of input ports may be configured to record a reception time of the control pack, and each of the plurality of output ports may be configured to set in the control packet, as a new control time, a time obtained by subtracting from the control time a difference between a scheduled transmission time of the control packet and the reception time. Therefore, the stop time can be appropriately set, and network communication efficiency can be increased.

The control packet may include data regarding the direction of the first packet to be transmitted after the control packet. In this case, (a) when the data regarding the direction of the first packet indicates a direction from a source node of the control packet to a destination node of the control packet, the processing unit may specify one of the output ports from an address of the destination node, and (b) when the data regarding the direction of the first packet indicates a direction from a destination node of the control packet to a source node of the control packet, the processing unit may specify one of the output ports corresponding to one of the plurality of input ports from which the control packet has been received, as an output port from which the first packet is to be output. Only the case (a) may be applied.

When the detection unit detects a second control packet configured to collect a predicted delay time from a source node of the control packet to a destination node of the control packet, the processing unit may set in the second control packet a sum of a predicted delay time included in the second control packet and a predicted delay time that will be incurred in the relay device, as a new predicted delay time, the predicted delay time that will be incurred in the relay device being held in association with one of the plurality of output ports that is specified from the address of the destination node. The automatic measurement of a control time can be addressed.

When the detection unit detects a third control packet configured to collect a predicted delay time from the destination node of the control packet to the source node of the control packet, the processing unit may set in the third control packet a sum of a predicted delay time included in the third control packet and a predicted delay time that will be incurred in the relay device, as a new predicted delay time, the predicted delay time that will be incurred in the relay device being held in association with one of the plurality of output ports that is specified from the address of the source node. The automatic measurement of a control time can be addressed.

A program for allowing a computer or a processor to perform the process described above may be created, and the program may be stored in a computer-readable storage medium or storage device such as a flexible disk, an optical disk such as a compact disc read-only memory (CD-ROM), a magneto-optical disk, a semiconductor memory (for example, ROM), or a hard disk. The data being processed is temporarily stored in a storage device such as a random access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control method controlling communication between a first node and a second node via a relay device, comprising:

transmitting a control packet from the first node to the second node before transmitting a first packet having a higher priority than another packet to be relayed;

stopping a packet from being output from a packet storage device for the another packet by the relay device, for a period indicated by the control packet, the packet storage device being included in one of a plurality of output ports of the relay device from which the first packet is to be output;

transmitting the first packet from the first node to the second node or from the second node to the first node during the period;

transmitting a second control packet from the first node to the second node, the second control packet being configured to collect a predicted delay time from the first node to the second node; and setting in the second control packet a sum of a first predicted delay time included in the second control packet and a predicted delay time to be incurred in the relay device located along the path from the first node to the second node, as a new first predicted delay time, in accordance with the second control packet, the predicted delay time being held in the relay device in association with one of the plurality of output ports that is specified from the address of the second node, before transmitting the second control packet.

2. The communication control method according to claim 1, further comprising:

transmitting a third control packet from the second node to the first node, the third control packet being configured to notify the first node of the first predicted delay time and to collect a second predicted delay time from the second node to the first node; and setting in the third control packet a sum of the second predicted delay time included in the third control packet and a predicted delay time to be incurred in the relay device located along the path from the second node to the first node, as a new second predicted delay time, in accordance with the third control packet, the predicted delay time being held in the relay device in association with one of the plurality of output ports that is specified from the address of the first node.

3. The communication control method according to claim 2, further comprising:

transmitting a fourth control packet from the first node to the second node, the fourth control packet being configured to notify the second node of the second predicted delay time.

4. The communication control method according to claim 1, wherein the period indicated by the control packet is one of a period between a first time when the relay device received the control packet and a second time when a time equal to a control time has elapsed, a period between a third time when the relay device received the control packet and a fourth time when a time that is a sum of the control time and a time corresponding to a transmission delay time from a transmission source of the first packet to a transmission destination of the first packet has elapsed, the first packet being transmitted after the control packet, a period between a fifth time when a time obtained by subtracting a time corresponding to the transmission delay time from the control time has elapsed since the relay device has received the control packet and a sixth time when a time that is twice the time corresponding to the transmission delay time has elapsed, and a period between a seventh time when a time obtained by subtracting a time that is twice the time corresponding to the transmission delay time from the control time has elapsed since the relay device has received the control packet and an eighth time when the time that is twice the time corresponding to the transmission delay time has elapsed.

5. The communication control method according to claim 1, further comprising:
setting in the control packet, as a new control time, a time obtained by subtracting from the new control time included in the control packet a difference between a scheduled transmission time of the control packet at the relay device located along the path from the first node to the second node and a reception time of the control packet, before transmitting the control packet.

6. The communication control method according to claim 1, wherein the transmitting of the control packet is performed at a time equal to a control time before the transmitting of the first packet, the control time being included in the control packet transmitted from the first node.

7. A relay device comprising:
a plurality of output ports each including
a first storage device that stores a first packet being a first priority, and
a second storage device that stores a second packet being a second priority lower than the first priority; and
a processor that detects a receipt of a control packet at each of a plurality of input ports, the control packet transmitted before the first packet and including a control time to be used for performing control to stop a packet from being output from the second storage device in one of the plurality of output ports, and that,
when the control packet is detected, controls one of the plurality of output ports to stop the second packet from being output from the second storage device for a period which is indicated by the control packet and during which the first packet is to be reached to one of the plurality of input ports, the one of the plurality of output ports being an output port which is indicated by the control packet and which outputs the first packet,
wherein each of the plurality of input ports is configured to record a reception time of the control packet, and
each of the plurality of output ports is configured to set in the control packet, as a new control time, a time obtained by subtracting from the control time a difference between a scheduled transmission time of the control packet and the reception time.

8. The relay device according to claim 7, wherein
the period indicated by the control packet is one of
a period between a first time when the relay device received the control packet and a second time when a time equal to the control time has elapsed,
a period between a third time when the relay device received the control packet and a fourth time when a time that is a sum of the control time and a time corresponding to a transmission delay time from a transmission source of the first packet to a transmission destination of the first packet has elapsed, the first packet being transmitted after the control packet,
a period between a fifth time when a time obtained by subtracting a time corresponding to the transmission delay time from the control time has elapsed since the relay device has received the control packet and a sixth time when a time that is twice the time corresponding to the transmission delay time has elapsed, and a period between a seventh time when a time obtained by subtracting a time that is twice the time corresponding to the transmission delay time from the control time has elapsed since the relay device has received the control packet and an eighth time when the time that is twice the time corresponding to the transmission delay time has elapsed.

9. The relay device according to claim 7, wherein
the control packet includes data regarding a direction of the first packet transmitted after the control packet,
when the data regarding the direction of the first packet indicates a direction from a source node of the control packet to a destination node of the control packet, the processor specifies one of the output ports from an address of the destination node, and
when the data regarding the direction of the first packet indicates a direction from a destination node of the control packet to a source node of the control packet, the processor specifies one of the output ports corresponding to one of the plurality of input ports from which the control packet has been received, as an output port from which the first packet is to be output.

10. The relay device according to claim 7, wherein
when the processor detects a second control packet configured to collect a predicted delay time from a source node of the control packet to a destination node of the control packet, the processor sets in the second control packet a sum of a predicted delay time included in the second control packet and a predicted delay time to be incurred in the relay device, as a new predicted delay time, the predicted delay time to be incurred in the relay device being held in association with one of the plurality of output ports that is specified from the address of the destination node.

11. The relay device according to claim 10, wherein
when the processor detects a third control packet configured to collect a predicted delay time from the destination node to the source node of the control packet, the processor sets in the third control packet a sum of a predicted delay time included in the third control packet and a predicted delay time to be incurred in the relay device, as a new predicted delay time, the predicted delay time to be incurred in the relay device being held in association with one of the plurality of output ports that is specified from the address of the source node.

12. A non-transitory computer readable recording medium having stored therein a program for causing a computer in a relay device that includes a plurality of output ports each having a first storage device that stores a first packet being a first priority and a second storage device that stores a second packet being a second priority lower than the first priority, to execute a process comprising:
receiving data indicating that a receipt of a control packet at each of a plurality of input ports has been detected, the control packet being transmitted before the first packet is transmitted and including a control time used to perform control to stop a packet from being output from the second storage device in one of the plurality of output ports; and
controlling one of the plurality of output ports to stop a packet from being output from the second storage device for a period which is specified from the control time included in the control packet and during which the first packet is to be reached, the one of the plurality of output ports being an output port which is specified from the control packet and which outputs the first packet, wherein each of the plurality of input ports is configured to record a reception time of the control packet, and each of the plurality of output ports is configured to set in the control packet, as a new control time, a time obtained by subtracting from the control time a difference between a scheduled transmission time of the control packet and the reception time.

* * * * *